United States Patent
Chow

(10) Patent No.: US 9,135,363 B2
(45) Date of Patent: Sep. 15, 2015

(54) METHODS AND SYSTEMS FOR AUTOMATIC CONTENT RETRIEVAL AND ORGANIZATION

(75) Inventor: Edmond Kwok-Keung Chow, Hong Kong (HK)

(73) Assignee: Gvoto (Hong Kong) Ltd., Hong Kong (HK)

( * ) Notice: Subject to any disclaimer, the term of this patent is extended or adjusted under 35 U.S.C. 154(b) by 1095 days.

(21) Appl. No.: 12/538,688

(22) Filed: Aug. 10, 2009

(65) Prior Publication Data

US 2010/0313250 A1 Dec. 9, 2010

Related U.S. Application Data

(60) Provisional application No. 61/185,270, filed on Jun. 9, 2009.

(51) Int. Cl.
| | |
|---|---|
| *H04L 29/06* | (2006.01) |
| *G06F 17/00* | (2006.01) |
| *G06F 21/10* | (2013.01) |
| *G06F 17/30* | (2006.01) |

(52) U.S. Cl.
CPC ......... *G06F 17/30899* (2013.01); *G06F 21/10* (2013.01); *H04L 63/08* (2013.01)

(58) Field of Classification Search
USPC .......................................................... 726/26
See application file for complete search history.

(56) References Cited

U.S. PATENT DOCUMENTS

| | | | |
|---|---|---|---|
| 6,748,421 B1 | 6/2004 | Ozkan et al. | |
| 2002/0098856 A1 | 7/2002 | Berg et al. | |
| 2003/0018624 A1 | 1/2003 | Hsiao et al. | |
| 2005/0195446 A1* | 9/2005 | Kasatani | 358/402 |
| 2006/0184609 A1* | 8/2006 | Deng | 709/203 |
| 2008/0195664 A1* | 8/2008 | Maharajh et al. | 707/104.1 |
| 2009/0024631 A1 | 1/2009 | Monahan | |

FOREIGN PATENT DOCUMENTS

| | | |
|---|---|---|
| CN | 1697531 A | 11/2005 |
| CN | 1897658 A | 1/2007 |
| CN | 101002201 A | 7/2007 |
| CN | 101022577 A | 8/2007 |
| CN | 101053264 A | 10/2007 |
| CN | 101286975 A | 10/2008 |
| EP | 1747650 A1 | 1/2007 |
| JP | 2008-287311 A | 11/2008 |
| WO | WO 2006/020938 A2 | 2/2006 |

OTHER PUBLICATIONS

International Search Report and Written Opinion for Patent Application No. PCT/CN2009/073220 mailed on Mar. 25, 2010, 11 pages.

* cited by examiner

*Primary Examiner* — David Le
*Assistant Examiner* — Devin Almeida
(74) *Attorney, Agent, or Firm* — Baker & Hostetler LLP

(57) ABSTRACT

Methods and systems for automated retrieval of content embedded in or referred to in a message received in a user account are provided. A UCM and/or a UCR may access a user account and retrieve a message from the account. The message may be then analyzed to extract information related to the content that may be included in the message. The content associated with the extracted information is accessed and retrieved. The retrieved content is presented to the user.

21 Claims, 16 Drawing Sheets

| Content Access Directive Template |||
|---|---|---|
| Data Item: | Description: | Example value: |
| Creation Timestamp | The creation time of this directive and by what entity, if applicable | TS=Monday, 2008-05-19 09:09:05 UTC; ByEntityType=UCR |
| Last Modified Timestamp | The last modification time of this directive and by what entity, if applicable | TS=Tuesday, 2008-05-20 08:11:34 UTC; ByEntityType=UCD |
| Content Location | The location of access, such as a URL, a file path, or some initiating metadata. | Video/1234.avi |
| Authentication Location | The location where authentication of access, if applicable, would take place | www.abcd.net |
| Access Protocol | The protocol for retrieving or receiving the content if applicable | ftp |
| Content Format | The content format if known | H.264 |
| Recommended Content Handler | The content player or handler recommended, if any, to render the content | quicktime |
| Credential Reference | A unique reference to authentication credential, such as a logon name and password pair. A reference is assigned to a credential when being made available to UCR for the first time. Subsequent use of the credential may then be referred to by this reference. | CR010 (i.e., credential reference 10th.) |
| Logon name | Logon name for access authentication. | User123 |
| Logon password | Logon password for the logon name | mypassword |
| Availability | The date and time when the content would become available if not immediate | Monday, 2008-05-19 09:09 UTC |
| Expiry | The date and time when the content is no longer for access if known | Monday, 2008-06-19 09:09 UTC |
| Continuous Feed | Whether the content is on-going in real time | false |
| Standing Retrieval | Whether this content retrieval should continue on its own without further notification, until some external request, content expiry, or meeting some criteria specified herein. The rules governing such autonomous retrieval are also specified herein. | isAutonomous=true; Polling=true; PollFrequencyMins=60; PollTimeOutSecs=5; MetadataOnly=true |
| Maximum Size | The maximum total file size or playback time for all constituent files or content. This prevents an unreasonably large content file from hogging up computing resources. | maxDownloadLimit=true; maxDlLtByFileSize=true; maxDlLtKBytes=1000000; maxStreamLimit=false (e.g., continuous feed) |
| Supplement | Any supplementary information needed in addition to what has already been provided in order to retrieve or otherwise receive the | ContentLocationValueType=isMetadata; MetadataType=torrent |

FIG. 3

Content Header Template (Part 1 of 2)

| Data Item: | Description: | Example value: |
|---|---|---|
| Creation Timestamp | The creation time of this header and by what entity, if applicable | TS=Monday, 2008-05-19 09:09:05 UTC; ByEntityType=UCR |
| Last Modified Timestamp | The last modification time of this header and by what entity, if applicable | TS=Tuesday, 2008-05-20 08:11:34 UTC; ByEntityType=UCD |
| Header Reference 401 | The primary reference to this header | 2008-05-19_09:09:05-UTC-UCD464114;UCR1213289; A=John_May@def.org;R= Michael@xyz.com;I=32432 |
| Secondary Reference 402 | A unique reference to content headers sharing the same primary header reference (e.g., an individual piece of content from a content access directive of standing retrieval) | 2008-05-20_09:09:05-UTC-Show232042 |
| Referrer 403 | The name/ID of referrer of content of interest | Name=Michael Luk |
| Addressee 404 | The addressee (group or individual, or their aliases) the content of interest is sent to | John_May@abcdef.org |
| Parental Guidelines | The specification of audience that the content of interest is or is not suitable for. | ParentalGuidelines= TV_G |
| Content Type 405 | The primary media type of the content of interest, such as video, audio, photo or text. (Example of secondary media type is audio annotation or background music for photo.) | PrimaryContentType= Photo |
| Content Privacy 406 | Whether the content may be made available to unaddressed UCRs: no (private); only UCR groups of which addressed UCRs are member (group); or unconditionally yes (public) | public |
| Content Primary Title 407 | The 1st title either explicitly given as part of the content or derived from the subject of a content notification message or through other means | John Fowler's Blog |
| Content Secondary Title 408 | The 2nd title either explicitly given as part of the content or derived from the subject of a content notification message or through other means | Weekend picnic |
| Content Availability 409 | The time & date of content availability for play-back & delivery mode (on-demand, broadcast) | Time=2008-05-21 08:00 UTC; DeliveryMode=OnDemand |
| Availability Expiry 410 | The time and date, the number of playbacks, or some criteria that define the availability expiry | ExpiryType=ByTime; ExpiryTime=2008-07-21 08:00 UTC |

| Content Header Template (Part 2 of 2) |||
|---|---|---|
| Data Item: | Description: | Example value: |
| Retrieval Mode 411 | Whether the content of interest is to download or stream-receive upon availability or upon user request | Recv=stream When=user |
| Operational Capabilities 412 | The operations that may be applied to the content through UCR or other means of control, such as saving content locally at UCR, rewind and fast forward, and so on. | SaveContent=No; PlaybackPause=Yes; Rewind=Yes; Forward=No |
| Size 413 | The duration or quantity of the content if known and applicable | 2h23m15s |
| Playback Schedule 414 | The schedule that governs the playback of content; it may also be specified in relation to other content of interest. | Weekly=Monday; Start=2008-05-21 08:00 UTC |
| Destination List 415 | The destination list to which the content (or its header) be categorized | Rental |
| Pre-Show Content 416 | The series of header references (as well as secondary references if applicable) of content to be shown before the content of interest starts | S1=2008-02-12_09:32:05-Ad-A=ad_src@1234.com;R=http://www.1234.com/ad_group1232/food543.avi;I=5352 |
| Post-Show Content 417 | The series of header references (as well as secondary references if applicable) of content to be shown when the content of interest ends | S1=2008-03-16_09:29:04-Ad-A=ad_src@ggfeed.com;R=http://www.ggfeed.com/ad_group14555/finance0950452.avi;I=009892 |
| Intra-Show Content 418 | The series of header references (as well as secondary references if applicable) of content to be shown amid playback of the content of interest. | S1=2008-04-07_09:12:42-Ad-A=ad_src@vdwew.com;R=http://www.vdwew.com/ad_group124/travel5453.avi;I=888443; S2= S1=2008-02-12_09:32:05-Ad-A=ad_src@1234.com;R=http://www.1234.com/ad_group1232/food543.avi;I=5352 |

From: John Doe
Date: Thu 7/3/2007 3:51 PM EST
Subject: Our team won!
Message Body:
The last inning is incredible. Peter hit a home run followed by Paul doing another one! Check this out:
ftp://www.myownstorages123.info/jdoe123/game07022008.wmv
login: jdoe
password: abcabc Cheers, John

1401

```
<item>
  <title>Our team won!</title>
  <addmeta:from>John Doe</addmeta:from>
  <addmeta:date>Thu 7/3/2007 3:51 PM EST</addmeta:date>
  <link>ftp://www.myownstorages123.info/jdoe123/game07022008.wmv</link>
  <description>The last inning is incredible. Peter hit a home run followed by[... 14 more word in message]</description>
  <addmeta:logon>jode</addmeta:logon>
  <addmeta:passwd>abcabc</addmeta>
</item>
```

1402

From: John Doe
Date: Thu 7/4/2007 6:11 PM EST
Subject: Check this out!
Message Body:

http://www.sharewonderfulmoments.info/watch?video=wewewewe

It's very funny.

1403

```
<item>
  <title>Check this out!</title>
  <addmeta:from>John Doe</addmeta:from>
  <addmeta:date>Thu 7/4/2007 6:11 PM EST</addmeta:date>
  <link>http://www.sharewonderfulmoments.info/video/wewewewe</link>
  <description>[*link-1*] It's very funny.</description>
  <addmeta:originalurl>http://www.sharewonderfulmoments.info/watch?video=wewewewe</addmeta:originalurl>
</item>
```

METHODS AND SYSTEMS FOR AUTOMATIC CONTENT RETRIEVAL AND ORGANIZATION

CROSS-REFERENCES TO RELATED APPLICATIONS

The present application claims benefit under 35 U.S.C. §119(e) of U.S. Provisional Patent Application No. 61/185,270, filed Jun. 9, 2009, entitled "Automatic Content Retrieval and Organization," the disclosure of which is herein incorporated by reference in its entirety for all purposes.

BACKGROUND

In the recent years, people are increasingly receiving information using electronic communication technologies like email, Short Message Service (SMS), Really Simple Syndication (RSS), etc. Various devices, e.g., computers, cellular phones, and other mobile communication devices, can be used to send and receive digital information using these electronic means. The improved affordability and portability of these devices have also contributed to this growing trend. As a result, more information is being shared using these electronic communication technologies than ever before. The information being shared includes digital information such as text messages, audio messages, videos, etc. A person who wishes to use these and other emerging communication technologies needs to possess some amount of technical knowledge about the operation of these technologies. The setup or configuration of the devices that can operate with these technologies can be challenging and assistance from knowledgeable users or system administrators may be needed. For example, a person may need to possess the knowledge about subscribing to and configurating a user account for a particular messaging system.

One example of such a communications technology is email. Emails are increasingly being used to exchange content between users. For example, user A may send an email to user B. The email may include a link to some digital information or content, e.g., a video clip, that user A would like to share with user B. Conventionally, user B would have to retrieve the email message using an email client, e.g., Microsoft® Outlook, open the email message, and physically click on the link to access the digital information associated with the link. As the number of such email messages, and other types of electronic messages, increase, it can get very difficult or time consuming for a recipient of such messages to manage and enjoy the content that is being shared. Moreover, a user may have difficulty in retrieving and organizing all the information being sent to him via these communications technologies and it is likely that the user may be overwhelmed with all the digital information that is sent or referred to him. The need for manual intervention or action in the retrieval of digital information referenced or otherwise mentioned in the electronic messages has limited the growth of information sharing.

The manual retrieval process can be difficult for an average user. For instance, a user may receive an email message on his mobile phone and the message may include a uniform resource locator (URL) for downloading a video file that is 100 MB in size. Considerations such as download speeds and bandwidth costs may deter the user from retrieving the video file using his mobile phone. Further, even after the video file is downloaded, the on-device media player may not be compatible with the video format or type of the downloaded video file. The user would then need to retrieve the message and the corresponding video file at a later time, e.g., when he is home where he has a faster download speed, or may need a device with a compatible media player. In addition, every message that the user receives, which includes one or more external referrals to digital information, would require a certain degree of manual intervention or action on the user's part that is repetitive at best, and may often need substantial time investment on the part of the user. In addition, complications involving conversion from one media type to another or from a streamed media to a stored or downloaded media may deter the user from actually accessing the digital information.

SUMMARY

In an embodiment, a method for retrieval of digital content is provided. The method includes accessing a message sent to a user message account, the message including information related to digital content, analyzing the message to identify the information related to the digital content, retrieving the digital content based at least in part on the information related to the digital content, and storing at least a portion of the digital content on a storage medium. In this method, the accessing, the analyzing, and the retrieving are performed substantially free from user interaction.

In another embodiment, a computer-readable storage medium storing a plurality of instructions for controlling a processing unit of a computer system to obtain digital content is provided. The processing unit may access a message sent to a user account, analyze the message to identify information referring to a location of digital content, access the digital content based at least in part on the information referring to the location of the digital content, obtain the digital content, and store at least a portion of the digital content on a machine-readable storage medium.

In yet another embodiment, a universal content manager (UCM) is provided. The UCM may include a message retrieval module configured to communicate with a messaging system and retrieve one or more messages from the messaging system, the one or more messages being associated with one or more user accounts and including one or more pieces of information related to one or more items of digital information, a message analysis module configured to analyze the retrieved one or more messages and obtain the one or more pieces of information related to the one or more items of digital information, a notice generation module configured to generate a notification, the notification including the one or more pieces of information related to the one or more items of digital information, and a communication interface configured to communicate the notification to an external system.

In still another embodiment, a universal content receiver (UCR) is provided. The UCR may include a communications interface module configured to receive a notification from an external system, the notification including information for accessing an item of digital information, a content retrieval module configured to obtain the item of digital information, substantially free of user interaction, based at least in part on the information for accessing the item of digital information included in the notification, a data interface module configured to communicate the item of digital information to a device, and a content processing module configured to prepare the item of digital information for playback on a device.

In an embodiment, a computerized system for automated retrieval of digital content is provided. The system may include a message retrieval unit configured to obtain a message sent to a user message account, the message including information related to a location of the digital content, a message analysis unit configured to parse the message and identify the information related to the location of the digital content, a content retrieval unit configured to obtain the digital content based at least in part on the information related to the location of the digital content, and a storage unit configured to store at least a portion of the digital content.

In an embodiment, a server system for obtaining digital content is provided. The server system may include a processing unit that may accept authentication information associated with a user account configured to receive a message, the authentication information being used to access the user account, access the user account using the authentication information and obtain the message, analyze the message and identify one or more sources of digital content included in the message, generate one or more uniform resource identifiers (URIs), wherein the one or more URIs are associated with the one or more sources of digital content, generate a listing of digital content, the listing including information for locating the digital content, and provide the listing of digital content to an external system.

In another embodiment, a method for communicating digital content is provided. The method may include accessing one or more user message accounts and obtaining a message from the one ore more user message accounts, the message including information about one or more sources of digital content, generating a uniform resource identifier (URI), the URI being associated with a listing having information about the one or more sources of the digital content, providing the URI to an external system, the external system supporting one or more subscriber accounts and the URI being accessible by the one or more subscriber accounts, receiving authentication information for a subscriber account, from among the one or more subscriber accounts, to access the listing via the URI, and providing the subscriber account access to the listing.

In yet another embodiment, a method for communicating digital content is provided. The method includes accessing one or more user message accounts, obtaining a plurality of messages from the one or more user message accounts, each of the plurality of messages identifying one or more sources of digital content, generating a plurality of unique uniform resource identifiers (URIs), each of the plurality of URIs being associated with a listing having information about the one or more sources of digital content identified in one or more messages from among the plurality of messages, the one or more messages obtained from a user message account from among the one or more user message accounts, providing the plurality of unique URIs to an external system, each URI, from among the plurality of URIs, being accessible only by a single subscriber account, from among a plurality of subscriber accounts managed by the external system, receiving a request from a first subscriber account, from among the plurality of subscriber accounts, to access the listing via a first unique URI, from among the plurality of URIs, and providing the first subscriber account access to the listing via the first unique URI.

The following detailed description, together with the accompanying drawings will provide a better understanding of the nature and advantages of the present invention.

BRIEF DESCRIPTION OF THE DRAWINGS

FIG. 3 is an illustration of a content access directive according to an embodiment of the present invention.

FIGS. 4A and 4B illustrate structure of a content header according to an embodiment of the present invention.

FIG. 14 illustrates sample listing of digital content that may be used in the embodiment of FIG. 13.

DETAILED DESCRIPTION OF SPECIFIC EMBODIMENTS

Figure 1:
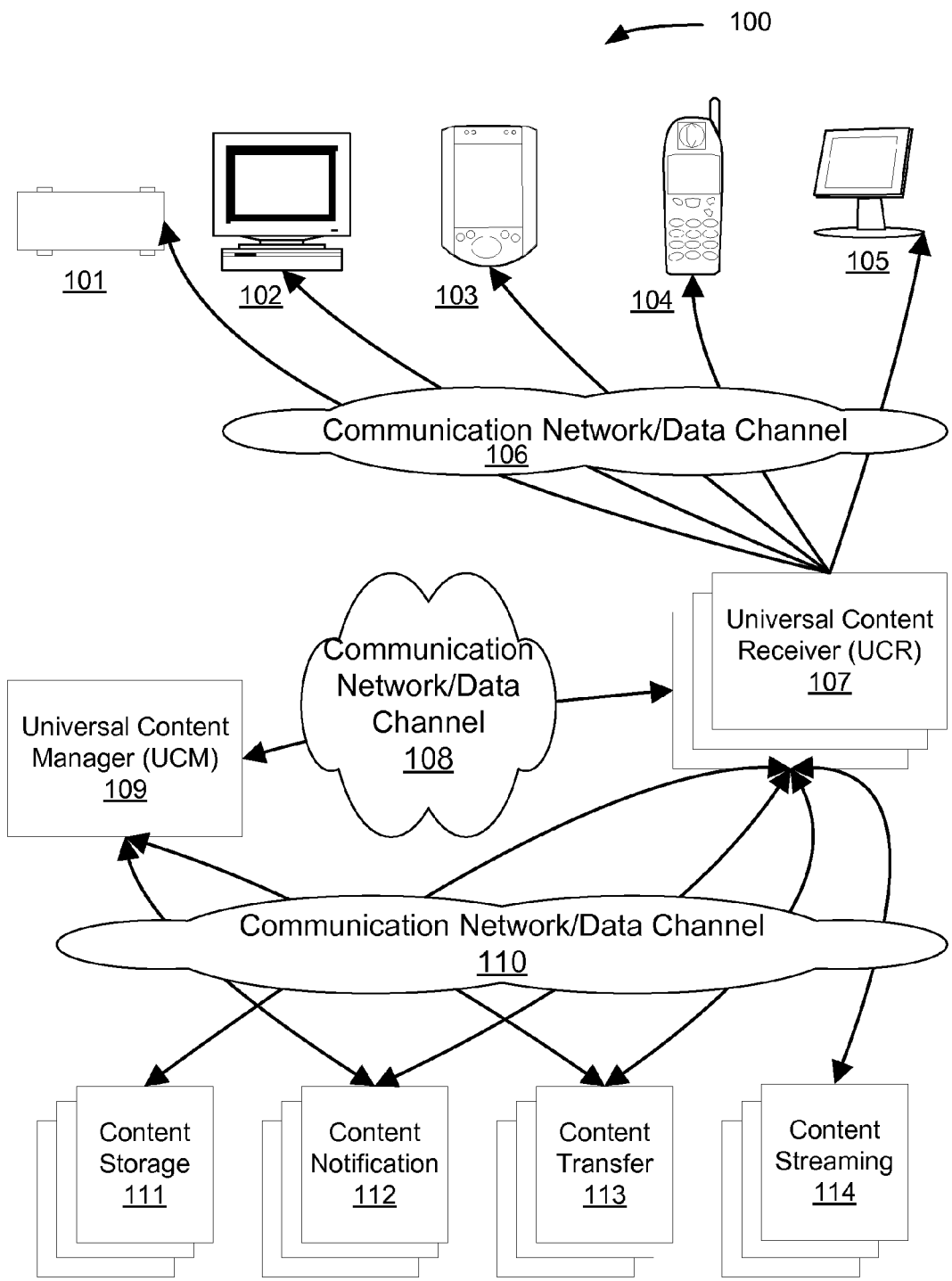
FIG. 1 is a high-level block diagram of a system for automatic content retrieval and organization according to an embodiment of the present invention.

FIG. 1 is a high-level block diagram of a system 100 according to an embodiment of the present invention. System 100 may include multiple sources of digital information or digital content such as content available on storage (111), a content notification means (112), a content transfer means (113), and a content streaming means (114). Content storage 111 may be a repository where content is stored. The content may include text, audio, graphics, or video. Content storage 111 may provide a plurality of means of access, e.g., directory-mounted access like NTFS (Microsoft's NT File System) or network-based access like FTP (File Transfer Protocol). Access to content storage 111 may require authentication.

Content notification means 112 may provide a content notification that is not the intended content of interest, but rather is a notice that some content of interest is available. In one embodiment, a content notification may contain a reference to a location of the content of interest and may also include a means for accessing or retrieving the content of interest. For example, a Uniform Resource Locator (URL) not only can serve as a reference to the location of the content of interest, but also may serve as a means of accessing that content. A BitTorrent™ seed is another example of a means for accessing or retrieving a content of interest. A content notification may be either active or passive. An active content notification is one that is provided asynchronously, i.e., a user does not have to initiate request for receiving the content notification from content notification means 112, e.g., a message received via Push e-mail. A passive content notification is one that is served synchronously, i.e., a user has to actively initiate a request for retrieval of content notifications from content notification means 112, e.g., a message received via a POP server (Post Office Protocol). To receive a content notification, a user may need to have an account. Authentication may be needed in order to retrieve the content notification. In some embodiments, a content notification may include instructions that specify an operation to be performed by a processing entity that receives the notification. For example, a webpage may contain a plurality of pictures or their thumbnails, and there may be instructions in the notification to retrieve pictures from the webpage whose title or name has certain keywords. The resulting content of interest can be a photo show comprising the requested pictures. Similarly, several media clips of the same show could be referenced and combined as a single video show in playback. Furthermore, such instructions may include a series of instructions for accessing an online resource, e.g., a webpage, identifying the location of the content of interest included on the online resource, accessing the location by providing authentication information, and retrieving the content of interest available at the location.

Content transfer means 113 may provide a mechanism to send content of interest from a content provider to a plurality of content receivers. For example, a POP server (content provider) may deliver a video as an attachment to an email, which may be received by an email client (content receiver). The video in this case is the content of interest, and upon completion of the transfer, the entire video is available for playback or other purposes without further support from the content provider. In some embodiments, multiple instances of transfer may be needed for sending a particular content, e.g., a large video file may be broken into several pieces for ease of transfer. In one instance, each piece of the video file may be transferred from different content providers all of whom may have at least a portion of the video file, e.g., BitTorrent®. Similar to a content notification, an active content transfer is one in which the content is transferred asynchronously and a passive content transfer is one in which the content of interest is transferred synchronously. Authentication may or may not be needed for each session of content transfer.

Content streaming means 114 may facilitate the process of transmitting content in form of a continuous data stream while allowing a recipient to playback, render, or otherwise access the content as it arrives, without the need for receiving the entire content prior to being accessed. This process may include data buffering and data flow control during content transfer from the content provider to a content receiver. On-request content streaming is one where the streaming process starts upon request by a content receiver, e.g. a media server transmitting a media file in "asf" (Advanced Streaming Format) upon a media player's request. Content streaming in broadcast mode is one where content is streamed without any request from a potential content receiver, e.g., a digital television broadcasting system that transmits content-bearing signals over the air, even if there are no receivers processing the signals.

A content provider may perform various functions. For example, an email server may deliver an email message containing only a subject line and a URI to a streaming content. In this case, the email server is a content provider and the email message is a content notification. When the email server sends an email message containing audio, photo, video, documents or non-content notification text, it is performing a content transfer. In addition, a streaming media server that delivers a scheduled presentation may exhibit an on-request streaming behavior.

Furthermore, a single piece of content may be delivered by more than one content provider. Each content provider may identify the content or a portion of the content by unique metadata or provide a file containing both the metadata and the content or portion of the content. This ensures that the content receiver can properly track and reconstruct the content. For example, BitTorrent™ is a file sharing and retrieval protocol that can deliver a large file using multiple content providers. Its metadata file is called a "torrent" file. A message containing such metadata may be regarded as a content notification since the metadata enables a compatible software client to download a particular content of interest even though the content is being provided by multiple sources.

System 100 may further include a universal content manager (UCM) 109 coupled to one or more universal content receivers (UCR) 107 via a communication network 108. UCM 109 and UCR 107 communicate with the various content sources via a network 110. UCM 109 may analyze content notifications and provide instructions to its assigned or otherwise associated UCRs 107 for retrieving or otherwise receiving content of interest and scheduling its playback. UCR 107 may accept content from various sources, interact with users for content playback and other allowable operations, and process the content for delivery to a destination device, e.g., a multi-media display 105, a mobile phone 104, a portable device 103, a desktop computer 102, or a Set-Top Box (STB) 101. UCR 107 may also serve as a content provider (e.g., to another UCR). UCM 109 may perform management functions, while UCR 107 may act as an instrumentality that carries out the instructions from UCM 109. In addition, multiple UCMs may be used depending on the nature and amount of content to be managed.

Figure 2:
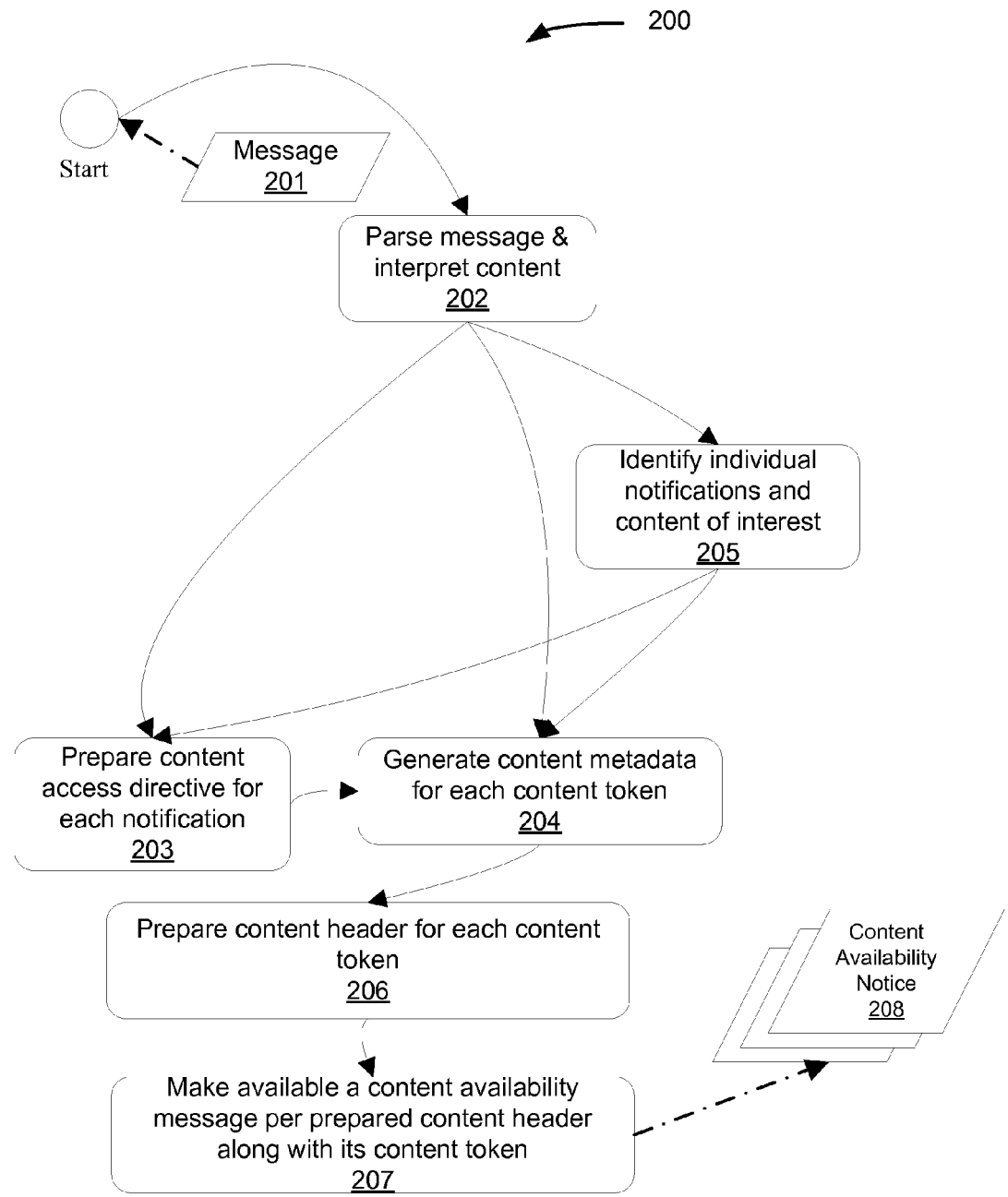
FIG. 2 is high-level flow diagram of a process for processing incoming messages according to an embodiment of the present invention.

Either the UCM or the UCR may process an incoming message. FIG. 2 illustrates a flow diagram of a process 200 for processing an incoming message according to an embodiment of the present invention. Incoming message 201 is parsed and its content is interpreted to identify presence of a content notification and/or content of interest (202). If the message only includes content notifications, then a content access directive, described later, is prepared for each such notification (203). The message itself is not considered as content of interest. If the message only includes one or more items of content of interest, metadata is generated for each item of content, e.g., media attachments to an email (204). The primary content of the message, if any, may itself constitute an item of the content, e.g., text message included in an email. If the message contains both content notifications and content of interest, then the content notifications are individually extracted and the items of content of interest are individually identified (205). Each extracted content notification or identified item of content of interest may be regarded as a content token. A content token is a means for retrieving content for presentation or processing. A content token need not include the actual content of interest, but may simply include a resolvable reference to the content. A content header, described below, is then prepared for each content token (206). One or more Content Availability Notices 208 (CAN), each containing the content header and the content token, may be generated for delivery or further processing (207).

A content access directive (CAD) may include information that may help a UCR access the content of interest. In an embodiment, a CAD may be included in a CAN. FIG. 3 shows an illustrative list of information that may be included in a CAD. It is to be noted that the types of information shown in FIG. 3 is for illustration purposes only. One skilled in the art will readily recognize that the CAD may include all or some of the information shown. In addition, CAD may include other information not shown in FIG. 3 but which may be useful for accessing and retrieving the content.

It should be appreciated that the specific steps illustrated in FIG. 2 provide a particular method of processing content retrieval according to an embodiment of the present invention. Other sequences of steps may also be performed according to alternative embodiments. For example, alternative embodiments of the present invention may perform the steps outlined above in a different order. Moreover, the individual steps illustrated in FIG. 2 may include multiple sub-steps that may be performed in various sequences as appropriate to the individual step. Furthermore, additional steps may be added or removed depending on the particular applications. One of ordinary skill in the art would recognize many variations, modifications, and alternatives.

A content header may provide information about the content that is not available through the content token but may be useful for other purposes. For instance, the content header may provide metadata about the content for preview, as well as data useful for operation and maintenance involving both the header and its associated content. A content token may include the actual content of interest and/or a content access directive. FIGS. 4A and 4B illustrate a structure 400 of a content header according to an embodiment of the present invention. It is to be noted that the various data items identified in structure 400 are for illustrative purposes only. A content header may have more or less data items than those shown in FIGS. 4A and 4B. In some embodiments, a content header may have different data items than those illustrated.

Header Reference data item 401 may specify a unique identifier for a content header. Any processing entity wanting to refer to the content header in question may use a Header Reference value to do so. For example, Header Reference value may be derived using the timestamp of header creation, concatenated with delimiters and other relevant data and a sequence number so that an identifier so generated would be unique within a system or application. Secondary Reference data item 402 provides distinction among different pieces of content of interest sharing the same Header Reference value. In an embodiment, an individual content header may be identified using both Header Reference and Secondary Reference if the Secondary Reference has a valid value. Referrer data item 403 may identify the sender of content notification (e.g., the name or email address of the person sending the notification) or its provider (e.g., the name or URI—Uniform Resource Identifier of the person or organization that offers the content, as in the case of content from a subscription service). In addition, Referrer data item 403 may notify the content recipients about the referrer of the content and allow the content recipients to perform content selection and filtering.

Addressee data item 404 may identify the messaging account or a user's aliases from which a content notification is received or the messaging account that receives the content notification. For example, a user of UCR may have multiple email accounts and contact numbers associated with his designated UCR. The user therefore may be able to select and filter content based on his different recipient addresses. Content Type data item 405 may identify the primary media type of the content of interest associated with the content header. A primary media type may identify an operational profile in relation to the content in question e.g., a primary media type of "text" means a user would be able to view the content as a series of pages. In some embodiments, a textual content could also include zooming and text-to-voice operations. A primary media type of "photo" may include any graphical presentation along with optional audio annotation, such as a power-point presentation involving a series of slides and audio annotation per slide and/or background music. The present invention is not limited to any particular media types nor dictates their supported features.

Content Privacy data item 406 may specify whether the content of interest may be shared with other UCRs or users of UCRs for whom the content was not originally sent. For example, a piece of content retrieved from a public website may be designated by default as "public". In this instance, a system may make the content available to other UCRs or users of UCRs even if they are neither the addressees nor related to the addressees in any way. Content Privacy data item 406 may be used to protect content privacy while allowing public content to be made available or recommended to other UCRs or their users based on some criteria. The criteria may be system-defined or user-specified, e.g., interest matching, popularity rating, and so on. Content of uncertain privacy level may be kept private until the system or the content notification sender provides a content rating. For example, a content notification sender may use certain indication, e.g., "privacy—make public" or "privacy—make group" markup tag in his content notification message. The system may then ascertain the intended privacy level of the content in the notification by analyzing the tag.

Content Primary Title data item 407 may provide a title to the content. In the absence of data for the Content Secondary Title data item 408, it may serve as the only title. In instances where content primary title 407 is insufficient to provide a full title, Content Secondary Title 408 may be used. For example, a piece of content may be fetched as part of a standing retrieval order as specified in a content access directive. The content may therefore be one of many that are retrieved under the directive. As such, the primary titles of all these pieces of content may share the same description denoting a collection (e.g., "My Blog"). Individual pieces would then have different secondary titles (e.g., "1-1-2008 Happy", "1-8-2008 Gloomy" and so on).

Content Availability data item 409 and Availability Expiry data item 410 may specify the time and date of the availability of the content for playback or streaming. The availability time may be different from the retrieval availability and expiry specified in a content access directive. Content Availability data item 409 is concerned with availability for playback or some other processing while the retrieval availability and expiry is associated with the availability of the constituent file(s) that make up the content of interest for retrieval. For example, a UCR may only permit the playback of a piece of content a day or two after its retrieval availability time. In addition, content Availability 409 may also specify a content delivery mode. For example, on-demand delivery means the content may be available for playback or some other processing after the date and time of availability until some expiry time and data. Broadcast delivery, on the other hand, indicates that the content may only be available at the specified date and time, and not any time after.

Retrieval Mode data item 411 may specify a method for obtaining the content once it is available. In some embodiments, a UCR may download the content in its entirety before its scheduled presentation or based on a user request. In other embodiments, the UCR may record the content while receiving the streaming data for the content, and later present the content for playback based on a schedule or upon user request.

Operational Capabilities data item 412 may specify user operations that may be applied to the content through a UCR or some other means. For example, a user may not be allowed to save a piece of content of interest, or to fast-forward a broadcast show. The restrictions may be administrative or technical in nature. Size data item 413 may provide information about the length of time or quantity in relation to content playback. For example, a video or audio show may have time as the size, while a photo or textual show may have the number of photos and pages as the size. If the content includes multiple pieces of information having different types of sizes, e.g., time and quantity, then the size for the content may or may not include the sizes of the multiple pieces of information.

Playback Schedule data item 414 may specify the schedule for playback in calendar or relative time. Calendar-time scheduling is similar to what one may specify in Video Cassette Recorder (VCR) to record shows of interest. Relative-time scheduling may allow a first piece of content of interest to be shown in relation to a second piece of content so that the first content may be played back after lapse of some period of playback of the second content. In some embodiments, the system may suspend the playback of the second content or show it in parallel with the first content, e.g., a split screen or picture-in-picture viewing. In some embodiments, Relative-time scheduling may provide time control for playing secondary content such as independent background music or advertisements in relation to some primary content in playback.

Destination List data item 415 may specify the content organization list to which the content of interest belongs. In some embodiments, pre-defined content organization lists may include but are not limited to "all", "on-demand", "scheduled", "rental", and "saved." The "all" may list all the contents or shows. The "on-demand" list may group content that may be played upon a user's demand (up to some expiry, if any). The "scheduled" list may group content that is scheduled to play at some specific time. The "rental" list may group content that is available through rental. The "saved" list may group shows that have been saved to some local storage or shows available through a UCR. Other custom lists may be defined by a user or a system. An example piece of content with no destination list value in its content header may be a piece of advertisement.

Pre-Show Content 416, Post-Show Content 417, and Intra-Show Content 418 are data items that may specify the series of header references (as well as secondary references if applicable) of the content to be shown at the beginning of the playback of the current content of interest, at the end of playback, and during its playback respectively. In some embodiments, the timing of these pre-shows, post-shows, and intra-shows may be specified in the content header or using Playback Schedule data item 414 in the content headers of these shows.

Figure 5:
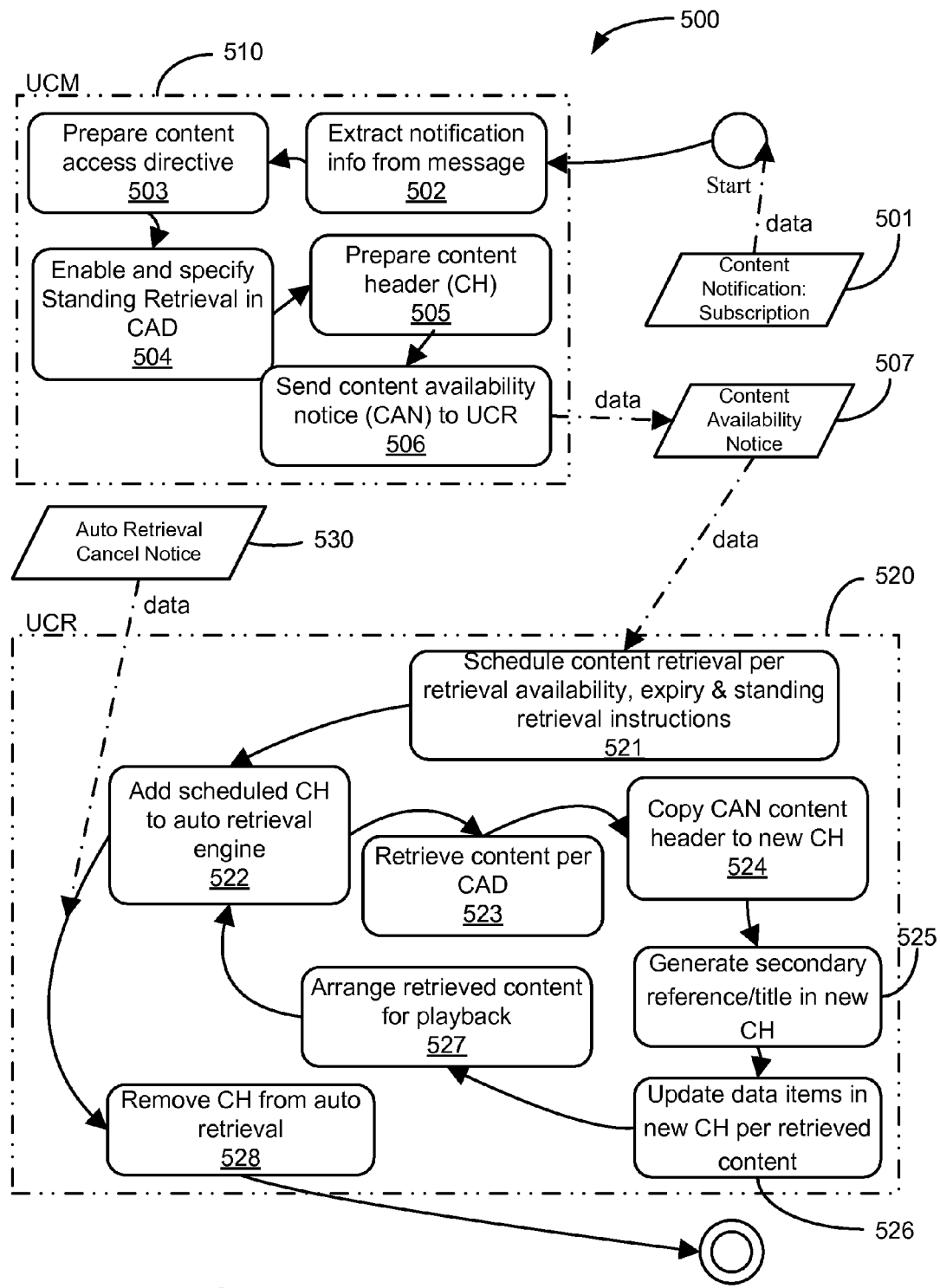
FIG. 5 is a high-level flow diagram illustrating a content retrieval process according to an embodiment of the present invention.

FIG. 5 is a high-level flow diagram of a process 500 for retrieval of content according to an embodiment of the present invention. In this embodiment, a UCM 510 is a content notification receiver and a UCR 520 is a content retriever. In this embodiment, UCM 510 receives a message containing a content notification (subscription) 501 (e.g., a URL such as http://rss.cnn.com/rss/cnn_freevideo.rss). UCM 510 processes the incoming message and determines that there is a content notification and no content of interest (502). Accordingly, UCM 510 prepares a content notification in the form of a Content Access Directive (CAD) (503). In particular, UCM 510 enables the Standing Retrieval data item in the CAD and specifies the rules and constraints for the retrieval (504), e.g., the frequency for polling the RSS feed identified by the URL. UCM 510 prepares a corresponding content header and creates a Content Availability Notice (CAN) 507 (505). UCM 510 sends the resulting CAN to UCR 520 (506). In some embodiments, a single CAN may be sent in multiple portions or packets and re-assembled upon arrival at its destination, or may be transferred as a stream of data over a data connection.

Upon receipt of CAN 507, UCR 520 schedules content retrieval operations in accordance to retrieval availability, expiry, and the standing retrieval instructions (521). An auto retrieval engine or some processing entity can be responsible for executing retrieval operations autonomously until expiry, until some schedule change or external request, such as an auto retrieval cancellation notice (522, 528, and 530). For example, an auto retrieval cancellation notice could remove the content header of a standing retrieval from the auto retrieval engine so that the engine would no longer retrieve, per schedule, any subsequent content associated with the content header. At the scheduled retrieval time, UCR 520 or its auto retrieval engine may retrieve the content of interest in accordance with each CAD of standing retrieval (523). Each piece of newly retrieved content may include a new content header with initial data item values derived from those in the original CAN (524). Each new content header may then be updated in accordance with its associated content, e.g., a secondary reference for the new header and a secondary title for the new content (525, 526). After the preparation of the metadata for the newly retrieved pieces of content, UCR 520 may now arrange them for playback (527), for example, making them available on the "on-demand" content organization list accessible to a user who may later request their playback.

UCR 520 of standing retrieval may want to report information about the content it retrieves to UCM 510. UCM 510 may use this information to maintain a library or catalog of content available at UCR 520. If the UCR is replaced, the UCM may then simply re-populate the content organization lists at the new UCR. This feedback mechanism may be hard-coded or may be configurable. The feedback request may be sent by UCM 510 to UCR 520 as part of Content Availability Notice or as a separate directive. The feedback request may include feedback on an individual piece of content basis, or for content, whose metadata matches some criteria. The feedback request may further include feedback-enabled pieces of content, information about metadata that may be communicated to the UCM (e.g., a MBS, Message Breakdown Summary, which is described below), and decision about whether the actual content is to be delivered to the UCM.

Figure 6:
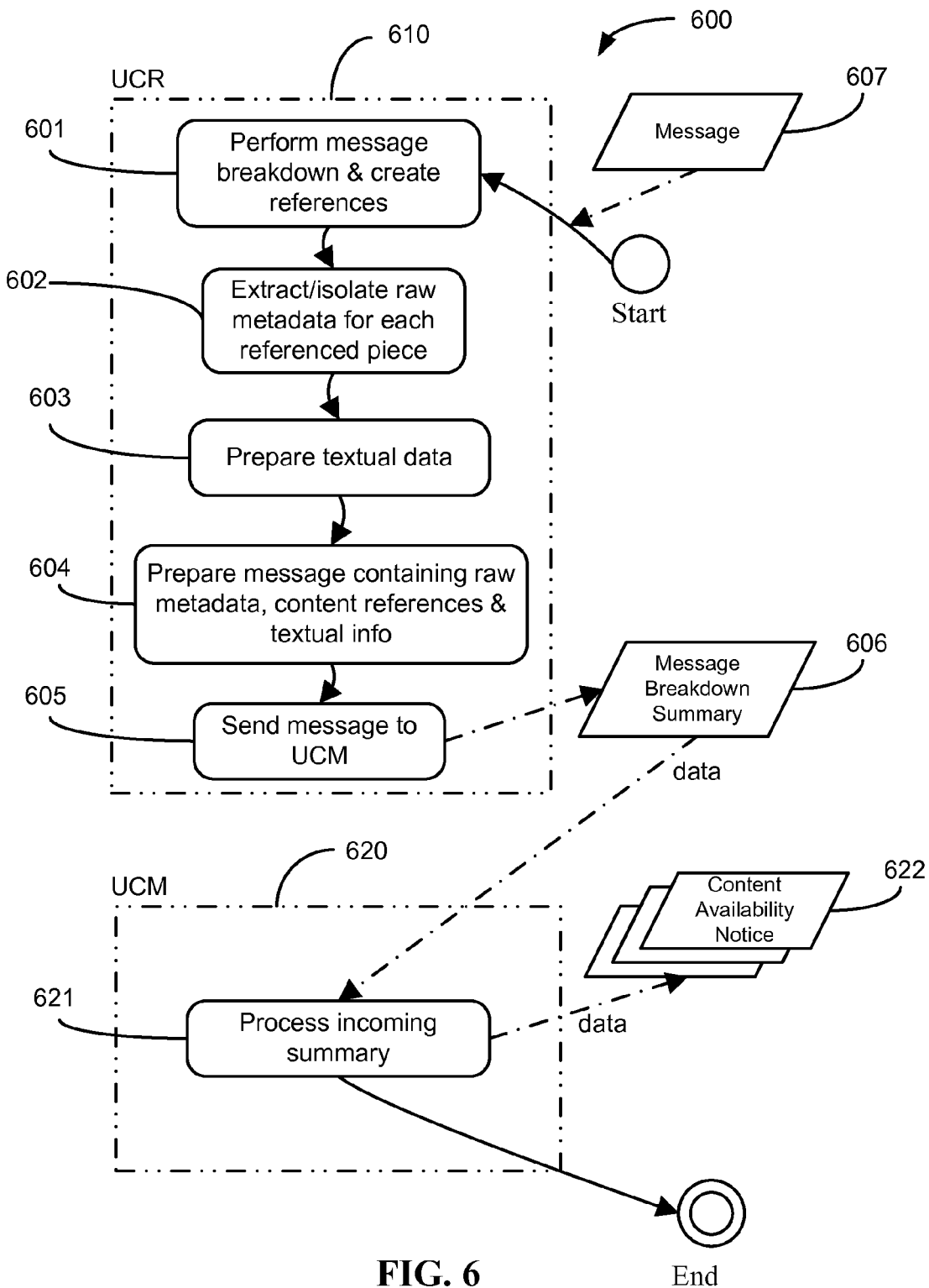
FIG. 6 is a high-level flow diagram illustrating data flow in the instance where a universal content receiver is a primary message receiver according to an embodiment of the present invention.

In some embodiments, a UCR may also serve as a primary message receiver. For example, a UCR may be equipped with a mobile telephony and data communicator or an interface to a telephony system so that the UCR can accept voice, SMS, and multi-media messaging service (MMS) messages directly instead of the messages passing through a UCM first. In some embodiments, non-textual messages such as voice and images suspected of containing content notifications may be converted to text and the parsing of the resultant text may also yield content notification information. FIG. 6 illustrates a scenario where the UCR serves as a primary message receiver.

It should be appreciated that the specific steps illustrated in FIG. 5 provide a particular method of processing content retrieval according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 6 is a high-level flow diagram of a process 600 for automated content retrieval according to an embodiment of the present invention. As mentioned above, in this embodiment, UCR 610 acts as a primary message receiver. The UCR performs a breakdown of an incoming message 607 to identify and isolate individual pieces of content (601). The UCR creates a reference for each piece of content. It extracts or otherwise isolates raw metadata (e.g., filename for a video file attachment) for each referenced piece of content (602). For pieces of content that might contain content notifications, e.g., a text body, a photo of barcode, or a voice recording of URL, the UCR can convert the content notification information into textual data (603). Parsing the message in this manner may produce references to individual pieces of content, metadata associated with the individual pieces of content and textual data representing the content, if any, for content notification extraction (604). A message containing this information is referred to as a Message Breakdown Summary (MBS) 606, which the UCR sends to a UCM (605, 620) for processing and analysis (621). After the processing and analysis, the UCM creates a plurality of Content Availability Notices (CANs) (622). In an embodiment, process 200 illustrated in FIG. 2 may be used by the UCM to process the MBS. One of the advantages of this embodiment is that the creation of the MBS by the UCR distributes or reduces the workload of the UCM for analyzing messages to extract information about the content. Instead the UCM may refer to the content references in the MBS to create CANs.

It should be appreciated that the specific steps illustrated in FIG. 6 provide a particular method of processing content retrieval according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7:
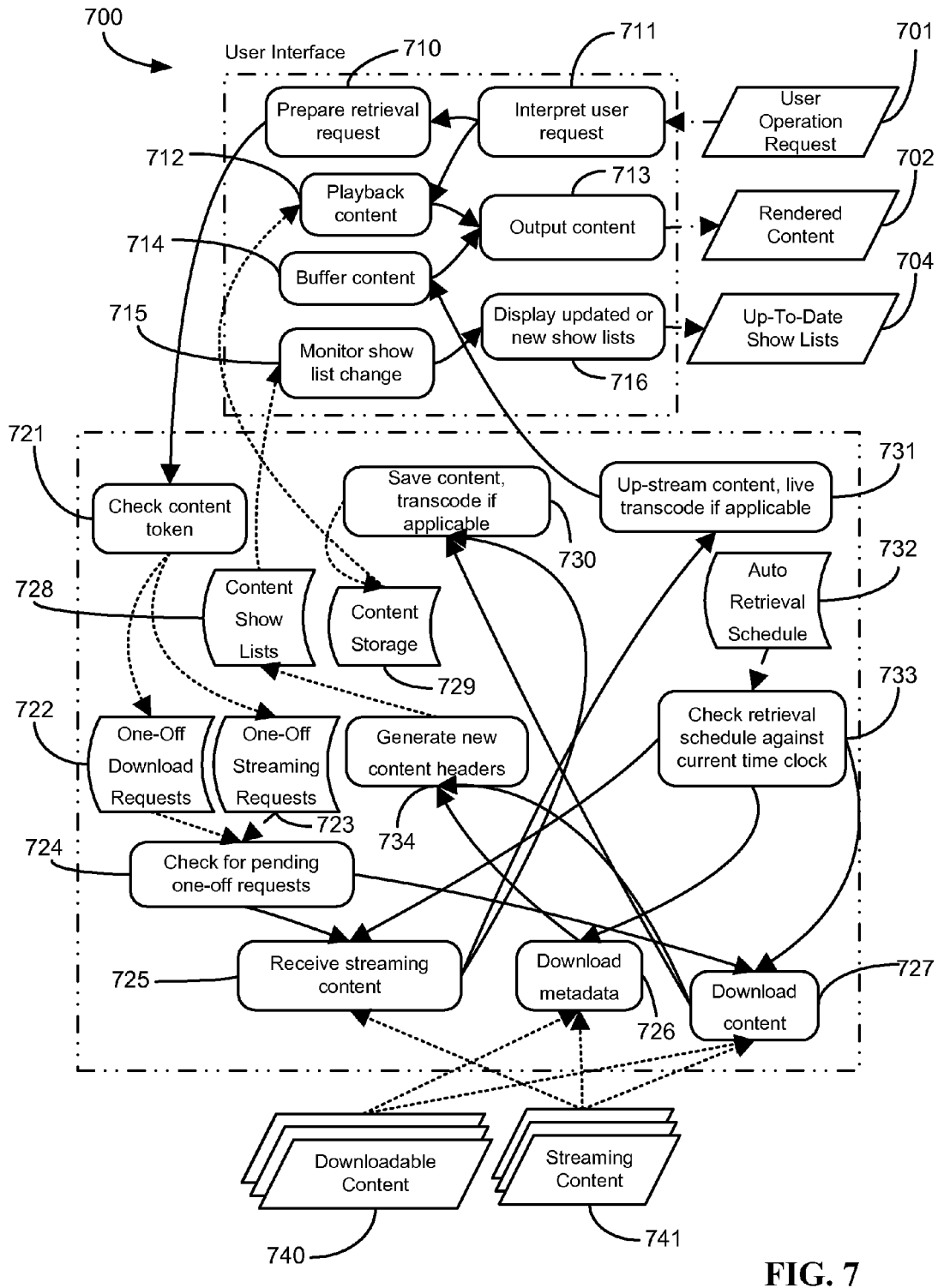
FIG. 7 is a high-level block diagram illustrating a content handling mechanism within a universal content receiver according to an embodiment of the present invention.

FIG. 7 is a high-level flow diagram of a process 700 that may be implemented in a UCR for processing content of interest, according to an embodiment of the present invention. In this embodiment, the retrieval schedule of the UCR gets populated with retrieval information for one or more pieces of content (732). In this embodiment the content of interest may be downloadable content 740 or a streaming content 741. The retrieval information may be received by the UCR based on content subscriptions mentioned or otherwise derived from messages, direct setup through UCM, or some other means. Depending on the instructions in the Retrieval Mode data item or its equivalent in the content header (733), for a new piece of content, the UCR may download just the metadata for the new piece of content (726), download the entire new piece of content (727), or trigger the delivery of the piece of new content as streaming data (725). In one embodiment, the UCR may also download and store a small portion of the digital content. The small portion of the content may be used later as initial buffered or cached content during playback of the digital content. One of the advantages realized by this technique is that it eliminates the initial wait time usually associated with receiving a streamed content. The new content metadata so retrieved may generate a new content header (734), and the relevant content lists 728 may be updated accordingly. A user interface of the UCR would monitor the changes in the content list (715). The user interface may display or otherwise make the updated content list available to the user (716, 704). A newly downloaded piece of content of interest (727), which is not yet known to the UCR and the UCM, may also result in a new content header being created (734). The relevant content list may be updated and the updated content list may be made available to the user as described above. In addition, the downloaded new content may be saved to a content storage ready for playback upon user request or per playback schedule (729). The content data may be transcoded to enable presentation of the content on a destination presentation device. For example, the downloaded content may be in MPEG2 format but the output display device can only display analog video. In such instance, the MPEG2 content may be converted to analog video for display on the display device. There are two modes of transcoding, e.g., batch mode and live mode. In the batch mode, the entire content data is transcoded before any of the content is made available to the destination presentation device. In the live mode, the content is immediately made available as soon as there is enough portion transcoded (usually defined by some content buffering criteria). In one embodiment, for downloaded content data, the batch mode transcoding is usually preferred over the live mode.

Furthermore, when the UCR receives a streaming content (725), the streaming content may be saved in a content storage when the streaming content has been received in its entirety. In one embodiment, the streaming content is saved in the content storage as a plurality of media files making up the content. In an embodiment, an apparatus embodying the UCR may have an external content storage, which may be accessed via a network. These media files can be available for playback similar to those of the downloadable content. In an embodiment, the streaming media may be transferred upstream for live transcoding (731) and further buffered (714) to be output (713) for display (702) or further processing. In another embodiment, the downloaded content data would also go through transcoding if applicable (730).

A user may instruct the UCR to either download content, retrieve and play content, or play a content available on a content storage (701). A user may choose a particular content using the content header. For instance, the user may want to save to a storage device, a copy of content for which there is only metadata available at the UCR (e.g., content with a Content Access Directive as a content token). A user interface of the UCR would receive and interpret this user request (711), and may prepare a retrieval request to retrieve the chosen content (710). The UCR may check the content token (e.g., a Content Access Directive (CAD)) of the content of interest for instructions on how to acquire the content (721). Both the Access Protocol and Content Format data items in the CAD or their equivalent may indicate if the content data is for download or streaming. The resulting retrieval request would trigger the UCR to either download the constituent content file/s (722, 724) or to request and receive a data stream (723, 724), based on the CAD. The retrieved content data may be saved to a content storage, with transcoding performed, if applicable. One of the advantages of separating the retrieval requests for download from the retrieval requests for streaming is that in general, retrieval requests for streaming usually have a higher priority than the retrieval requests for download. Hence, a default prioritization can be implemented using this distinction.

It should be appreciated that the specific steps illustrated in FIG. 7 provide a particular method of processing content of interest according to an embodiment of the present invention.

Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

If the user requests to watch a currently running broadcast, the UCR can request and receive the streaming content per the CAD. The incoming data stream (or the transcoded stream if transcoding is performed) can be output to the user after appropriate content buffering time, if any. The Continuous Feed data item in the CAD or its equivalent may correspond to the broadcast in this instance. In another instance, the user may choose to watch a show, which happens to be already available in the content storage. Assuming the content is already transcoded or otherwise ready to be presented, the UCR can perform playback of the show for the user with the content storage being a means of providing the content source.

It is to be noted that the user need not know which content (or which show) on the content (or show) lists is downloadable and which is of streaming media type, or whether the actual content is already available in the content storage. If the user wants to keep or make a copy of the content of interest within or outside the UCR, he may issue a command or press a "record" button on a device embodying the UCR. The time taken by the saving process may be of secondary concern to the user. As such, when a user requests to play a show that is available on a show list, that show may be downloaded, received as streaming data, or may be played from the local UCR storage. From the user's perspective, he may be more interested in whether a particular show is on-demand or time-bound rather than whether the show is played back from a local storage or from streaming data. As discussed above, streaming content data may still be saved as a downloaded file for later "on-demand" viewing, whereas for a time-bound and specific presentation, the show may be rendered from an incoming data stream through some content buffering should the user want to watch it as soon as it becomes available. In the other words, a UCR (or its controlling UCM or its proxy) may decide to download a particular content file or trigger a series of incoming data streams for reasons other than serving explicit user request.

In an embodiment, the UCR may continually download several pieces of content at any given moment and continuously receive multiple concurrent streams of data (e.g., broadcast channels) without any user request or pre-defined schedule. The choices of such download content and data streams may be based on a user's preference of topics, his channel or content viewing history, or a desire to eliminate or reduce the initial streaming wait. In an embodiment, the system may support only one means of content notification and submission (e.g., email). There are many ways to send a message including the content of interest, content notification, or both to a UCM or UCR. The present invention does not preclude any means of content notification and submission. For example, a UCM may provide a webpage allowing a user to submit such a message. The user may identify a recipient UCR or a group of recipient UCRs (e.g., by its individual ID, group ID, or a registered UCR user or user group), and create a message. The message may be parsed for content notification while being treated as content of interest itself. In addition, a form-based input page may list specific fields for entry by a user, e.g., content location or its metadata location, content availability and expiry, or whether the content is on-demand or time-bound with specific time availability. Furthermore, additional media files may be uploaded as content of interest and associated with the message being submitted. Such uploaded content data would be available to the intended recipient UCRs, similar to the external content data to which a UCR can have access through a Content Access Directive.

In an embodiment, a message may be submitted to the UCM or UCR by any means of, wireless or wire-line communication. The message may be in the form of text, audio, video, or graphics. The message may include the content of interest, or a content notification, or both. In some embodiments, a user interface for the UCM or the UCR may receive user input and process the user input similar to an incoming message. A message including content location (e.g., URL), metadata (e.g., torrent), content name (e.g., a text string or URI), or some other metadata in a content notification may be sufficient for the UCM or the UCR to attempt retrieval of associated content. In some embodiments, only a portion of the information available in a content access directive or a content header may be required by the UCM or the UCR to retrieve or organize the content. For example, if a title for the content to be retrieved is not provided, the content location or some other text such as "no title" may be used instead to designate the content.

In some embodiments, a user sending a message (sender) need not explicitly address a recipient UCM or UCR, e.g., using an IP address or a unique ID of a recipient UCM or UCR. The user sending the message may send an email containing content of interest and content notifications to a regular email address for a recipient user (recipient). The recipient user's email address may be registered with a UCM and associated with a particular UCR. In this instance, the UCM or the UCR may periodically poll the recipient user's email account that is associated with the email address for new email, and analyze the received emails for content of interest and content notifications. In other embodiments, an explicit address or contact number for a UCM or UCR may be used, e.g., a URL or a mobile phone number. In the instance where a message is sent to a UCM or its proxy that has more than one affiliated UCR, then additional information may be specified in the message to identify the intended UCR(s). The sender's email address and/or mobile phone number can be used for authentication purposes. A list of authorized sender's may be in a sender authorization list. The sender authorization list may be maintained per UCR or per UCR group. The sender authorization list may be managed by authorized personnel. In an embodiment, the sender authorization list may be accessed through a dedicated website. In addition, each authorized sender may be given customized permissions for playback, scheduling, and the level of access to the UCR or the UCR for that includes the recipient's existing show lists and schedules. For instance, one authorized sender may be permitted to submit content that would play automatically as soon as possible or at a specific time preempting any show currently in play, while another sender may not be given that same level of access. In an embodiment, an authorized sender may be able to view the existing show schedule on the UCM or UCR of a recipient user, while another authorized sender may only view empty schedule slots, and yet another authorized sender may have no visibility to the schedule.

In some embodiments, a UCR group may be set up so that content notification and content submissions for a member UCR can be visible and available to all members in the group. The setup to enable the sharing among a group of UCR may be accomplished in many ways. In an embodiment, a group email address or an instant messaging group may be set up and given the authority to send messages to each UCR in that UCR group. The group email address or the instant messaging group may include a contact email address or an instant messaging account identity for each UCR in the UCR group. Upon receipt of a content notification or submission by the group email address or upon its availability through the instant messaging group, all the UCRs in the UCR group may receive a copy of such notification or submission via the group distribution mechanism inherent in group emailing and instant messaging services. It is to be noted that the method mentioned above is for illustrative purposes only and one skilled in the art will recognize that other methods are possible to implement this functionality. Such methods are not outside the scope of this invention. Some of the other methods that may be used to implement this functionality may include use of a messaging middleware such as Java Messaging Service (JMS) that may provide a topic for UCRs for subscription. In an embodiment, a JMS client may accept content notifications and content submissions and make them available under the topic so that all subscriber UCRs can receive the content notifications and content submissions.

In an embodiment, a UCR may support a user account along with many aliases associated with that account, e.g., multiple email addresses that belong to the same user account. A single UCR may support several independent user or subscriber accounts and each user or subscriber may have his own private and public content. A user may be authenticated by the UCR, its associated UCM, or some other means before he can have access to the private content destined to the user account. The user may have access to the public content destined to any of the users supported by the UCR. Such public content may be made accessible, by default, to anyone having access to the UCR without any initial authentication.

In an embodiment, a UCR may also support a "guest" and/or "nomad" mode. A guest user may be a UCR user who may have a "home UCR" where content of interest destined to him may be delivered by default. If the guest user attempts to view or otherwise obtain his content of interest through another UCR, that UCR would normally deny him access. A UCR may support such a guest user in a guest mode and (after some authentication) may provide the guest user access to his content while blocking access to all content and metadata of other users supported by that UCR.

A nomad user has no home UCR, but may be authorized to operate a UCR that supports either the guest mode or the nomad mode, e.g., a hotel may provide every suite with a TV set embodying a UCR operating in nomad mode. In a nomad mode, a UCR will store a nomad user's content and metadata only for the current session. When the nomad user logs off or otherwise disconnects from the UCR, the UCR may purge the nomad user's content and metadata after a predetermined time. In an embodiment, the nomad user may interact with a webpage or a web browser associated with a centrally managed UCR to access/retrieve his content. The retrieved content data for presentation may reside on the centrally managed UCR or on the computing host where a centrally managed UCR proxy resides, e.g., the computer where a UCR embodying a Web browser is running on. One or more UCRs may act as a group to provide service to the nomad user. For example, a nomad user who is authenticated as a member of a UCR group may be able to share information with other members of the UCR group.

There are numerous methods for adding content notifications to a UCR. As described above an email message or an SMS message may include information needed to retrieve the content of interest or subscribe to a content broadcast. In some embodiments, the information needed to retrieve the content of interest or subscribe to a content broadcast may be embedded in a barcode referred to herein as Content Notification Embedded (CNE) barcode. The CNE barcode may be displayed to a user and the user may use a portable device to capture a picture of the barcode, the portable device may process the barcode to extract content notification information and send the content notification information as a textual message to an email address or phone number from a messaging account associated with the intended UCR. In an embodiment, the CNE barcode may further contain an online address or phone number for a central registration service. The portable device can scan the barcode and send the embedded information to the central registration service. The central registration service may use the identification information of the sending account, e.g., a phone number of a mobile phone, to identify the intended UCR or UCR group. In addition, a separate CNE barcode may be made available for the removal of content subscription. For example, a CNE barcode along with a "to add" barcode would together constitute an instruction to add a content notification and CNE barcode along with a "to remove" barcode would represent an instruction to remove a content notification. Alternatively, a single CNE barcode would add a content notification, while another single CNE barcode would remove the content notification for the same content.

In another embodiment, the portable device may capture an image of the CNE barcode and send it to the central registration service without first extracting the embedded information. The central registration service may process the image of the CNE barcode to extract the content and/or the content notification information. In this embodiment, the central registration service need not have any optical scanning or capturing capability.

Another method of adding content to a UCR is by use of authorization voucher. An authorization voucher may include text strings, which may be used to identify a UCR, a UCR group, or their users. The voucher may be time-limited, usage-limited or both, e.g., the voucher may expire after a specific date or some time lapse, and/or after certain number of uses, e.g., one-time use. Once the voucher expires, it may not be used anymore. The voucher may enable a content provider or a content notification submitter to submit content to a UCR and/or submit content subscription to a UCR without knowing the credentials of the UCR or its user. In an instance, a content broker or dealer may request a user of the UCR to try a content channel on the user's UCR. The user may provide the content broker with an authorization voucher. The content broker or his organization may use the authorization voucher to subscribe the content channel on behalf of the user. A self-service online system, e.g., a content channels directory website, that may provide one or more content channels, may accept the authorization voucher, enabling the system to provide user-selected content channels to the UCR or UCR group designated in the voucher.

There are many ways for a user of a UCR to obtain the authorization voucher. In an embodiment, the user may receive an authorization voucher every month by mail. In other embodiment, the user may call an automated authorization voucher dispenser, which may give out a one-time authorization voucher upon authentication. In yet other embodiment, the user may receive an authorization voucher in a reply to sending a SMS message from his registered mobile phone. In sum, any means that can identify a requester as an authorized UCR user may be used to deliver the authorization voucher to the user.

An authorization voucher may provide a key that helps to identify an individual UCR or UCR group and may provide a verification code. In one embodiment, both the key and the verification code may coexist in the same string of text as long as one of them is of fixed length or there are delimiters in the text string, or otherwise derived, to isolate the key and the code. The purpose of this verification code is to prove that the holder of this verification code has the temporary authorization to submit content to or subscribe to the content for the UCR(s) in question. There are many approaches and methods in the current state of art for generating a verification code for such a purpose, e.g., one-time password schemes such as Markus Kuhn's OTPW and Lamport's S/KEY. In addition, the key to a UCR or UCR group available in an authorization voucher may be encrypted so that the identity of the UCRs or their users can be protected. Furthermore, the UCR-identifying key may be combined or otherwise embedded into the verification code upon its generation in such a way that the key could later be retrieved when the verification code is being authenticated.

Figure 8:
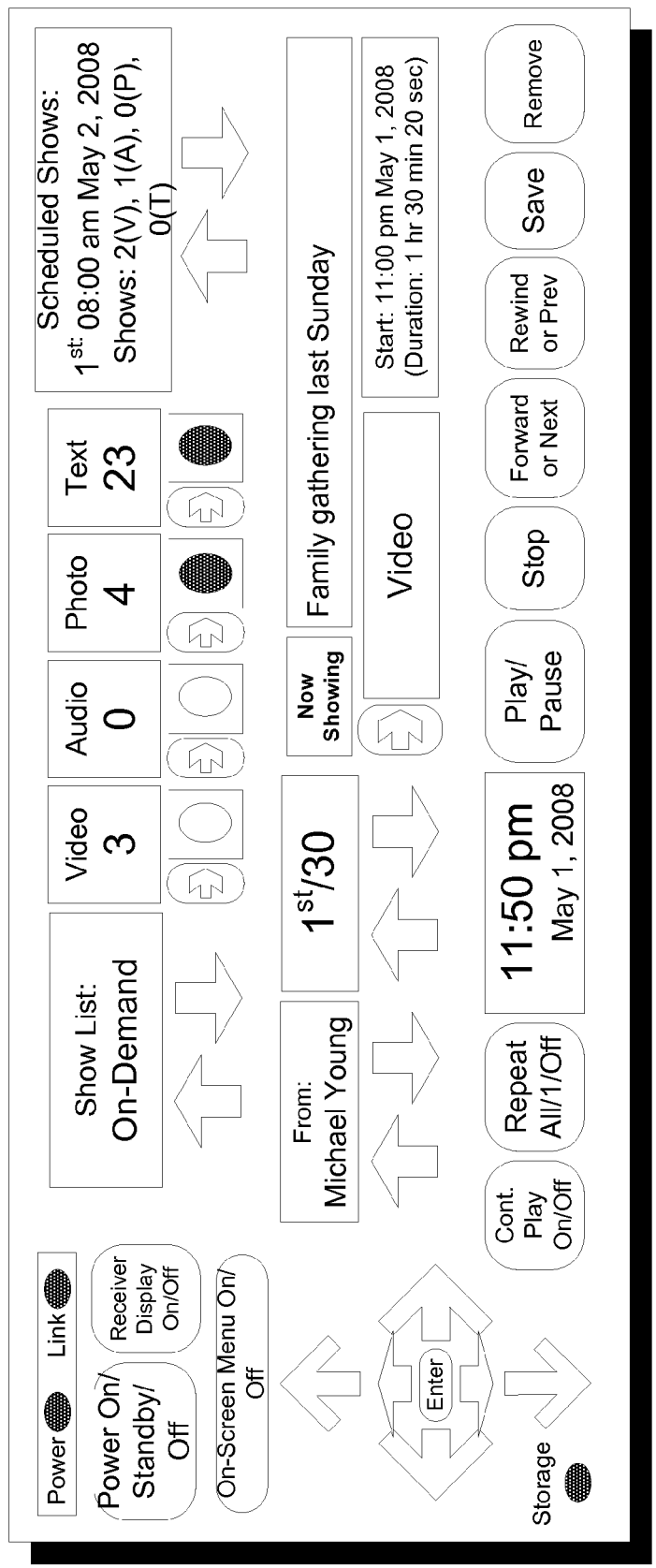
FIG. 8 illustrates a sample user interface screen for a universal content receiver according to an embodiment of the present invention.

The UCM and the UCR may be implemented using a variety of devices. For example, the functionality of a UCR may be implemented on a broadband modem (wireless or otherwise) with analog audio and video output. The UCM may be implemented in a control point (e.g., headend) for a broadband access network with which the broadband modem is associated. The UCM may use the communication infrastructure between the control point and its associated broadband modems to communicate with its associated UCRs, or use a separate communications networks. The audio and video output of the UCR may be connected to an audio/video input of a television (TV) set or a device accepting such connection. The playback control of the UCR may be provided through a web-based control, a remote control with the broadband modem as its receiver, added as a control panel on the modem, or a combination thereof. FIG. 8 shows a sample screen for a control panel for a UCR according to an embodiment of the present invention. In an embodiment, the UCR may be realized as a set-top box (STB) having a communication interface (e.g., for an internet connection, wireless or otherwise) and a plurality of audio/video interfaces to TV, monitor and other AV (Audio/Video) equipment. In other embodiment, a UCR or its functionality may be realized as part of a TV set equipped with a communication interface (e.g., internet).

In an embodiment, a UCM may be deployed on a dedicated server that exchanges messages and content data with its associated UCRs over a communications network (wireless or otherwise). In another embodiment, the UCR and UCM may be integrated into a single device (e.g., a mobile phone) or appliance (e.g., a TV set) or realize their respective functions on a general-purpose computer. In this instance, there would be one UCM for one UCR, rather than the one UCM for multiple UCRs arrangement and the communication between the UCM and UCR is internal within the device, appliance, or computer. In the instance where the UCM is implemented on the computer or the device or an appliance having a display, the content may be rendered on that display rather than on an external display. The computer, device, or appliance may access external content providers and receive messages (i.e., for content of interest and content notifications) through any data communication means, e.g., Internet connection (wireless or otherwise).

Figure 9:
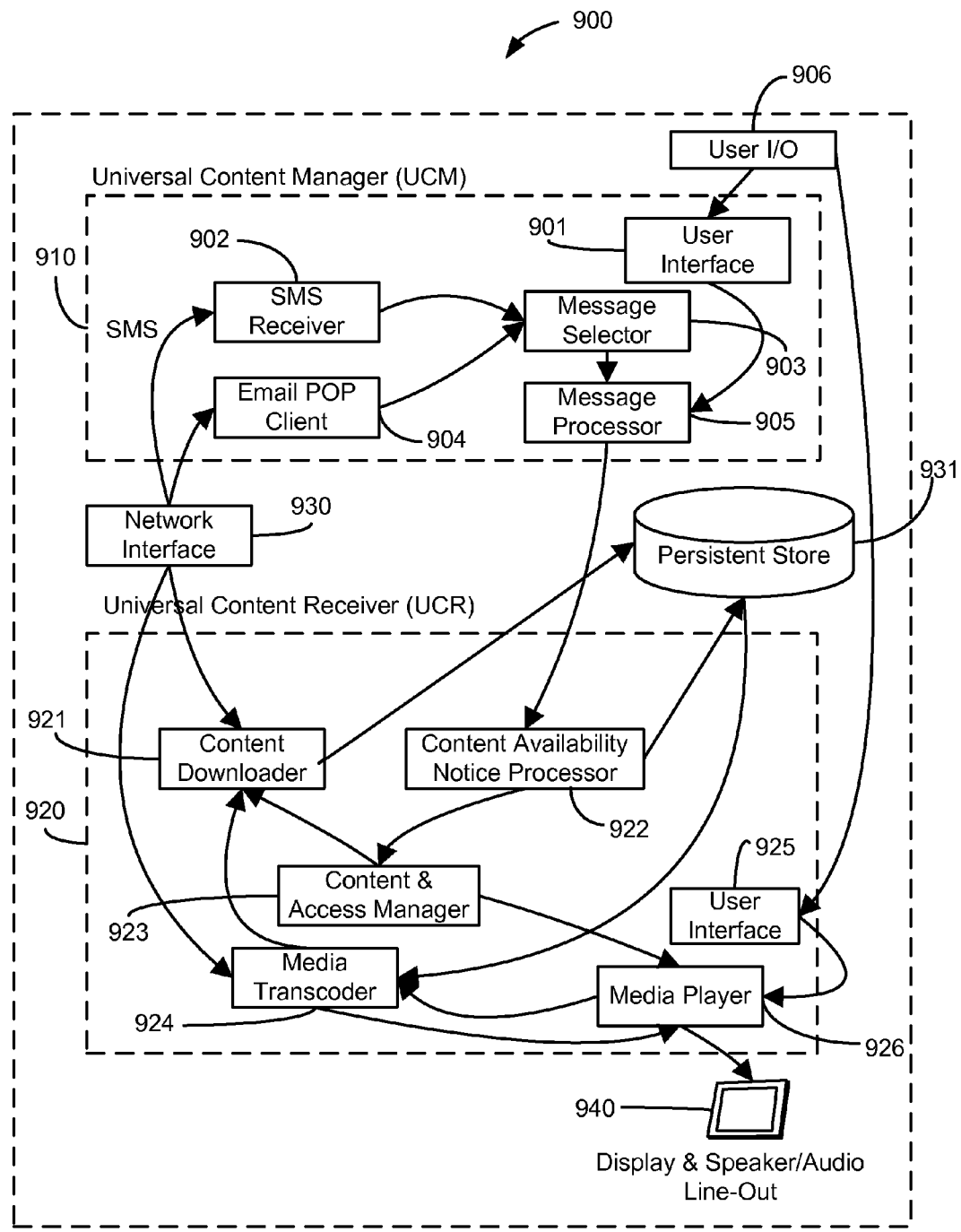
FIG. 9 is a high-level block diagram of an embodiment of the present invention.

FIG. 9 illustrates a device 900, e.g., a computer or a mobile phone, embodying a UCM 910 and a UCR 920 according to an embodiment of the present invention. In this embodiment, UCM 910 and UCR 920 are implemented as part of a single device on a network-enabled general-purpose computer. Device 900 includes a network interface 930, a persistent store 931, e.g., a hard drive or a memory card, a user I/O 906 (Input and Output interface), and a display and audio speaker plus an audio line out 940. UCM 910 may include an SMS receiver 902, email POP client 904, a message selector 903, and a message processor 905. SMS receiver 902 can accept SMS messages and email POP client 904 accepts email messages from network interface 930. Email POP client 904 may periodically poll an external POP server (not shown) for new email messages. Message selector 903 may accept both SMS and emails from SMS receiver 902 and email POP client 904, respectively. Message selector 903 may select messages from authorized submitters and pass them onto message processor 905, which parses and interprets the content of these messages. After message processor 905 parses the messages, it may generate corresponding Content Availability Notices (CANs), which may be delivered to the UCR.

UCR 920 may include a content availability notice (CAN) processor 922, a content downloader 921, a content and access manager 923, a media transcoder 924, and a media player 926. Upon receiving the CANs, CAN processor 922 may generate a content locator for each CAN identifying or otherwise referencing a piece of content of interest. A content locator may be an entry comprising title of the content, content type, retrieval type (i.e., download or streaming), content location, content filename, access credential if applicable, and name of the submitter or content referrer. CAN Processor 922 may also place content submissions available from CANs into persistent store 931. In an embodiment, the content locations in the corresponding content locators may refer to their locations in the store. For CANs that only include content notification, the corresponding content locations would refer to an external content provider. Content and access manager 923 may prepare a show list for each set of content locators it receives. Each entry in a show list may contain data that may enable media player 926 to display a content title and to request the content from media transcoder 924. In addition, content and access manager 923 may request content downloader 921 to retrieve downloadable media files of sizes below a certain threshold. The media files so downloaded may be transferred to persistent store 931 and the content location information embedded in the corresponding show entry displayed by media player 926 may be updated by content and access manager 923. In the event that media player 926 requests a show entry from a show list, the request may be directed to media transcoder 924. Media transcoder 924 may use the content location information embedded in the request to attempt retrieval of the requested content. The source of media file associated with the content may be persistent store 931 or network interface 930, e.g., if they are located on an external content provider or an external storage server acting as a persistent store for the UCR. Media transcoder 924 may not perform any transcoding if the retrieved media files are already in a format supported or requested by media player 926. In an embodiment, the system may choose to permit only the media formats supported by its media player component and therefore eliminate the need for a media transcoder component or its functionality.

In some embodiments, a user may interact with media player 926 through a UCR user interface 925 that may accept input from user I/O 906 of the device 900. A user may perform direct submission of content notification and content data through a UCM user interface 901 that may accept data input from user I/O 906. UCM user interface 901 may pass the direct submissions to message processor 905, which may in turn generate CANs for each of the submissions. It is to be noted that UCM user interface 901 and UCR user interface 925 may be realized as a single functional component or as part of another component such as media player 926.

Figure 10:
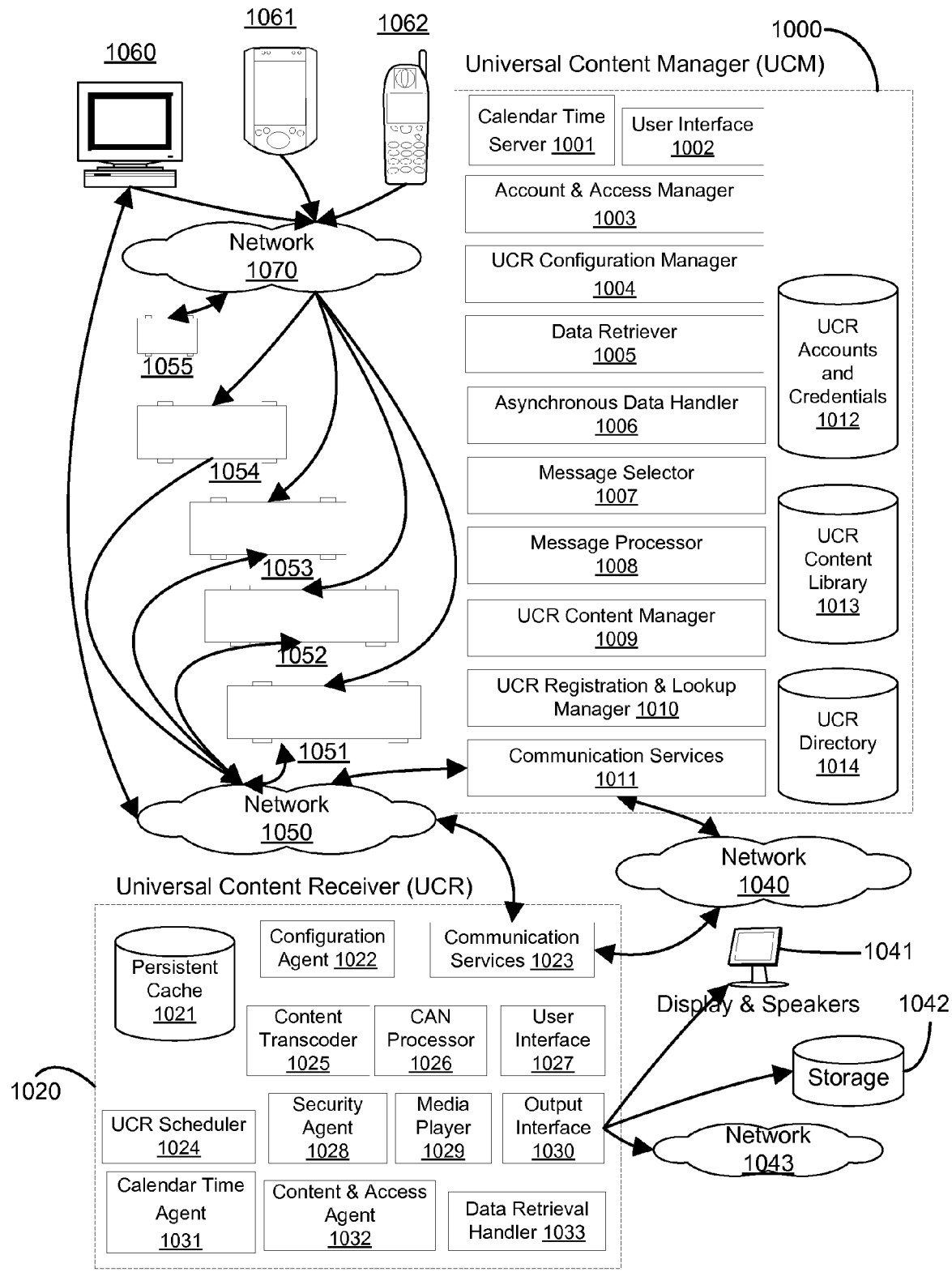
FIG. 10 is a high-level block diagram of another embodiment of the present invention

FIG. 10 illustrates an embodiment where a UCM 1000 and a UCR 1020 are implemented as discrete systems and are communicably coupled to each other via network 1040. In one embodiment, communications network 1070 connecting submitter's devices, e.g., a desktop computer 1060, a handheld computer 1061, and a cell phone 1062, and content providers, e.g., a mobile messaging service 1054, an email server 1053, a storage server 1052, and a media/web server 1051, communications network 1050 connecting the content providers and UCR 1020, communications network 1040, and communications network 1043 may be the same communications network.

In this embodiment, UCM 1000 may include the following functional modules and operational repositories. Calendar Time Server module 1001 may be used for maintaining and providing the current calendar time upon request, e.g., for UCR configuration and scheduling, as well as for periodically synchronizing the calendar times of UCRs, e.g., with the Calendar Time Agent 1031 in a UCR 1020 via a local Configuration Agent 1022. User Interface module 1002 may be used for interacting with a user or his equivalent so that the user can operate UCM 1000. The user operations may include administrative activities, provisioning of UCM 1000 and UCR 1020 that it controls or otherwise manages. For example, a UCM administrator could use User Interface 1002 to add user accounts to UCR 1020. Account and Access Manager module 1003 may be used for managing UCR user accounts, account credentials, aliases, and submission handles and their logon credentials, e.g., email addresses or mobile phone numbers for receiving messages of content notifications and submissions. Account and Access Manager 1003 may also manage authorization and permissions of message submitters, credentials for access to content providers, and security agents at the UCRs through their Configuration Agent.

UCR Configuration Manager module 1004 may be used for configuring and provisioning individual UCRs and managing configuration agents of those UCRs. Data Retriever module 1005 may be used for retrieving data from external content providers. Asynchronous Data Handler module 1006 may be used for processing data sent to UCM 1000 asynchronously, e.g., content submission and notification messages sent via SMS or push email. Message Selector module 1007 may be used for identifying legitimate or valid submitters of content notification or submission. Message Processor module 1008 may be used for parsing and analyzing incoming messages and Message Breakdown Summaries (MBS), and generating CANs. UCR Content Manager module 1009 may be used for maintaining content metadata, show lists and show entries per UCR and managing the Content and Access Agent in the UCR through the local Configuration Agent. UCR Registration and Lookup Manager module 1010 may map a UCR user account to an operational UCR and maintain an inventory of UCRs and their operational statuses.

Communication Services module 1011 may be used for providing communication services (including security) among the various functional modules and operational repositories, and for message exchange and data transfer with UCRs and external content providers (e.g., mobile communication interfaces, POP email retrieval, and HTTP/FTP file download). UCR Accounts and Credentials 1012 may be a persistent repository that may be used for storing, maintaining, and serving data needed by Account and Access Manager module 1003. UCR Content Library 1013 may be a persistent repository that may be used for storing, maintaining, and serving data needed by UCR Content Manager 1009. UCR Directory 1014 may be a persistent repository that may be used for storing, maintaining, and serving data needed by UCR Registration and Lookup Manager 1010.

UCR 1020 may include the following functional modules and storage systems. Configuration Agent module 1022 may be used for configuring and provisioning the UCR to make the UCR operational in response to UCR Configuration Manager 1004 and to users operating the UCR. The setup or change made through Configuration Agent module 1022 may be reported back to UCR Configuration Manager 1004. Communication Services module 1023 may be used for providing communication services (including security) among the various functional modules and storage systems, and for exchanging messages and data with UCMs and external content providers (e.g., mobile communication interfaces, POP email retrieval, and HTTP/FTP file download). Content Transcoder module 1025 may be used for transcoding the retrieved or otherwise received media files that are not in the formats supported or requested by a Media Player 1029. Content Transcoder module 1025 may also handle incoming streaming media data from Communications Services module 1023.

CAN Processor module 1026 may be used for processing incoming Content Availability Notices (CANs), generate content locators, and place submitted content of interest on a local repository (i.e., persistent cache 1021). Content and Access Agent module 1032 may be used for generating and maintaining show lists and entries, periodic data retrieval and content presentation schedules for subsequent content retrieval, and streaming and playback. Content and Access Agent module 1032 may prepare MBS for retrieved content data and send them to UCM 1000, and may check the free storage capacity of persistent cache 1021 for status reporting purposes. User Interface module 1027 may be used for receiving input related to performing administrative functions for UCR 1020. User Interface module 1027 may be implemented as a control panel with an associated on-screen menu configured to accept input. In an embodiment, a change in the UCR settings or data that may be required to be fed back to the UCM, e.g., a change of UCR account password may be fed back to Account and Access Manager module 1003 of the UCM by Configuration Agent module 1022. Configuration Agent module 1022 may receive the change notifications from the local functional modules, e.g., Security Agent module 1028.

Security Agent module 1028 may be used for authenticating users at UCR 1020 and handling security matters locally, e.g., configuring the security parameters of local Communication Services module 1023 for secured communication with UCMs as well as other external entities such as external content providers. Media Player module 1029 may be used for performing playback, streaming and rendering of media data (including text) received from Content Transcoder 1025. Output Interface module 1030 may be used for adapting output from Media Player module 1029 to be transmitted to its intended destinations, e.g., for playback on a video display with audio speakers 1041, for storage as a media file on a local storage 1042, or a portable device or an external content provider through a communications network 1043. Data Retrieval Handler module 1033 may be used for retrieving data from outside of the UCR. If authentication credentials are needed, Data Retrieval Handler module 1033 can query local Security Agent 1028 for obtaining and/or verifying the credentials.

UCR Scheduler module 1024 may be used for activating any periodic and scheduled activities at the UCR, such as automatic content metadata retrieval per content subscription and scheduled presentation of shows per content notification, submission, or user request. Calendar Time Agent module 1031 may be used for obtaining and keeping the current calendar time at the UCR. Persistent Cache 1021 may be a repository for storing, maintaining, and providing data needed by the functional modules in the UCR to perform their respective functions. In one embodiment, the UCR may use an external persistent cache accessible over a communications network.

In some embodiments, when an appliance or device embodying the UCR is provisioned, Configuration Agent module 1022 may send a registration message through Communication Services module 1023 to a pre-configured network address reachable by the UCM. The registration message may include an appliance identifier, e.g., a Media Access Control Address or a serial number, a one-time password, or a current network address of the appliance which may be assigned to the appliance either by the installer (human or otherwise) or by a local network service provider or its proxy. UCR Registration and Lookup Manager 1010 may extract this information from the registration message. Each UCR that is being provisioned may have an entry in UCR Directory 1014. UCR Registration and Lookup Manager 1010 may attempt to locate the entry for a UCR being provisioned in UCR Directory 1014 using the appliance identifier. If the entry is located, UCR Registration and Lookup Manager 1010 may append the entry with information in the registration message.

A UCR user may provide user registration information such as a username, password, and a plurality of user aliases, message retrieval accounts (along with their authentication or access credentials) and messaging addresses or handles of authorized submitters, as well as the appliance identifier and one-time password associated with the UCR. The user may provide the user registration information through an administrator, a self-service website or some other means of interacting with Account and Access Manager 1002 of UCM 1000. Upon successful verification of the one-time password based on the one stored in UCR Directory 1014 by UCR Registration and Lookup Manager 1010, Account and Access Manager 1003 may create an entry including the user registration information in UCR Accounts and Credentials repository 1012. UCR Registration and Lookup Manager 1010 may inform UCR Configuration Manager 1004 about the successful UCR and user registrations. UCR Configuration Manager 1004 may send configuration data, e.g., security parameters for secured communication and the current calendar time, to Configuration Agent 1022 of UCR 1020. Following this, Configuration Agent 1022 may set up UCR 1020 and make it operational. Upon completion of this process, UCM 1000 may process incoming messages on behalf of UCR 1020.

Desktop 1060, handheld computer 1061, and mobile phone 1062 may be used to submit messages and/or content notifications. A mobile messaging server 1054 may accept a message, e.g., SMS and MMS, sent through a mobile communications network and may route the message to its intended destination (i.e., a receiver associated with the destination handle or address such as a phone number). A Simple Mail Transfer Protocol (SMTP) server 1055 may accept email messages from email client software and deliver them to a POP server 1053 where an email recipient may retrieve emails using email client software. A storage server 1052 may provide persistent storage with network access. A media/web server 1051 may provide multi-media content for viewing, downloading, or streaming, in addition to accepting input from a web browser or its equivalent.

In an embodiment, messages from Mobile Messaging Server 1054 that are directed to the UCR may reach the Asynchronous Data Handler (not shown) of the UCR through Communication Services module 1023. The Asynchronous Data Handler may pass the messages to Message Selector 1007 for further processing. Data Retriever module 1005 may periodically logon and check for new email messages on POP server 1053 for each POP account associated with a UCR user and for all active users listed in UCR Accounts and Credentials repository 1012. Data Retriever module 1005 may communicate the new email messages to Message Selector 1007 for further processing.

In some embodiments, Message Selector 1007 may identify the recipient UCR user of each incoming message if the message is not addressed to a specific user account. Such non-specific message may include an SMS message sent to a phone number maintained by UCM 1000 as a common SMS receiver for multiple unrelated UCR users. In an embodiment, the username or its alias associated with the UCR user account may be specified in the first line of the message text. Subsequent lines may contain key-phrases and their attributes recognizable by UCM (e.g., through Message Processor 1007). For example, in "Content 1 Start=May 1, 2008 8 pm EST", the "Content 1 Start" may be a key-phrase and the date and time being its attribute. Other examples include "Content 1 ftp user=abcd", "Content 1 ftp password=efgh", and "Content 1 location=ftp://www.example4534.net/files", all providing instructions about content retrieval. Other conventions or methods may also be adopted for such purpose.

Based on the sender addresses or submitter identification, e.g., email addresses or originating phone numbers, Message Selector module 1007 may identify messages from authorized submitters for each UCR user account as provided by Account and Access Manager module 1003. Message Selector module 1007 may communicate the selected messages to Message Processor module 1008 for further processing. Message Processor module 1008 may generate a plurality of CANs (Content Availability Notices) per selected message. Message Processor module 1008 may communicate the CANs to the targeted UCR, which is the UCR associated with the UCR user. The CAN Processor at the targeted UCR may process the incoming CANs. Message Processor module 1008 also may send the CANs to UCR Content Manager 1009, which may extract metadata from the CANs to create entries in UCR Content Library 1013 thereby providing a centralized copy of available content per UCR. UCR Content Library 1013 may or may not keep the actual content submissions. For example, content retrieved from POP Server 1053 may be re-obtained whereas messages from mobile messaging server 1054 may not be re-obtained. UCM 1000 may adopt a policy of not keeping any actual content (i.e., its UCR Content Library is only a library of content metadata).

After UCR 1020 receives CANs through its Communication Services module 1023, CAN Processor module 1026 may generate the corresponding content locators and place any content submission in Persistent Cache 1021. These content locators may enable Content and Access Agent module 1032 to generate show lists, entries, and periodic data retrieval and content presentation schedules for subsequent content retrieval, streaming and playback. Content and Access Agent module 1032 may also manage and maintain the generated data. Content and Access Agent module 1032 may provide the show lists and entries and content presentation schedules to User Interface module 1027 for display and control, and the periodic or time-specific data retrieval and content presentation schedules to UCR Scheduler module 1024 for execution. Content and Access Agent module 1032 may direct Content Transcoder module 1025 to process downloaded content data and incoming streaming data, e.g., the auto play of a scheduled presentation or upon a user request to play a show. In an embodiment, Content and Access Agent module 1032 may direct Media Player module 1029 to fetch or otherwise receive the output of Content Transcoder module 1025 for playback and rendering. Content and Access Agent module 1032 may make download or streaming requests to Data Retrieval Handler module 1005, which may download the requested content data or initiate streaming through Communication Services module 1023. The downloaded content data may be placed in Persistent Store 1021 while the incoming streaming data would go though Content Transcoder module 1025.

UCR Scheduler module 1024 may be used for triggering any periodic, repetitive, or scheduled operation, such as the periodic download of content per content subscription. Similar to Content and Access Agent module 1032, UCR Scheduler module 1024 may use Data Retrieval Handler module 1005 to actually perform the download and initiate the data streaming. A UCR user may also initiate download or streaming of a particular show available on a show list. User Interface 1027 of UCR 1020 may interact with the user and map his operations and commands to specific requests to the appropriate functional module in UCR 1020. Content-related requests, e.g., play a show in a show list, may be sent to Content and Access Agent module 1032, which may coordinate with other functional modules to serve this type of requests.

Many advantages are realized from the architecture of the example embodiment shown in FIG. 10. In one instance, a new appliance embodying UCR 1020 can be easily configured to replace an old or broken appliance. UCM 1000 may be able to configure and provision the new appliance using the centrally maintained UCR data for an existing UCR user of the old appliance. The guest and nomad UCR modes can also be supported. Additionally, software upgrade can be done centrally on UCM 1000, which may also serve as a software and firmware distribution center to its associated UCRs.

Figure 11:
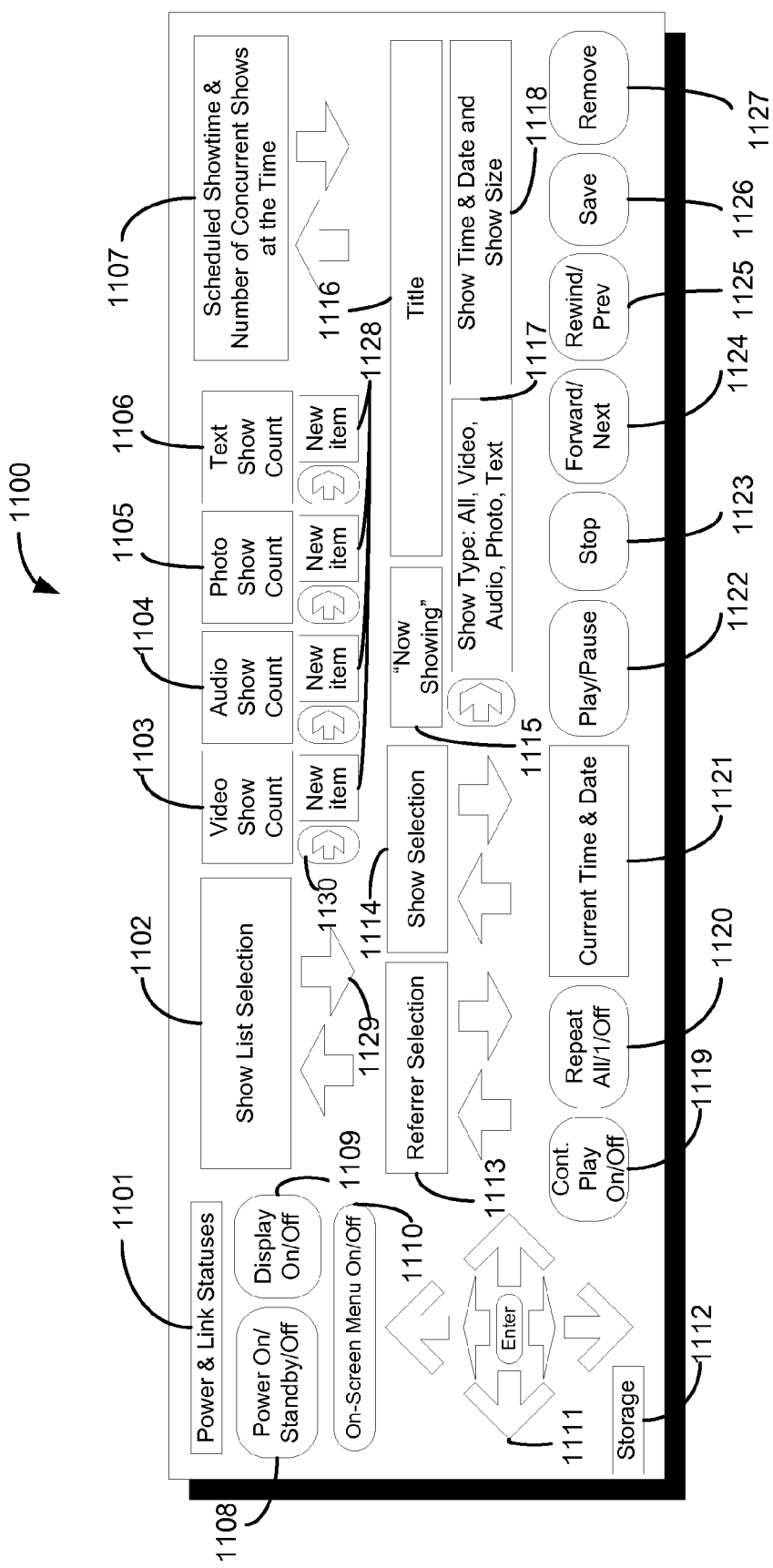
FIG. 11 illustrates another sample user interface according to an embodiment of the present invention.

FIG. 11 illustrates a sample user interface panel 1100 according to an embodiment of the present invention. User interface panel 1100 may be implemented in an appliance or device that may embody a UCR and/or a UCM. Section 1101 may include indicators for the operating status of the appliance, e.g., on, standby, and off, and network connectivity status, e.g., healthy link, limited connectivity, and loss of connectivity. A Power button 1108 may cycle the appliance from "off" to "standby" to "on" operating status. In the "off" operating status, the appliance may not be operational even if the appliance has power. In the "standby" operating status, the appliance may only play scheduled presentations or those authorized for auto play; all other operations may be disabled. In the "on" operating status, the appliance may be operational and all capabilities may be available. Receiver display on/off button 1109 may turn the visual display of the unit on or off except the power & link statuses and the four "new item" indicators 1128 without affecting the appliance's operational capabilities. On-screen menu on/off button 1110 may turn the menu available through the unit's video output on or off. On-screen menu button 1110 may make available all the operation capabilities and settings supported by the appliance, including those not available through the panel illustrated in FIG. 11, e.g., adding and removing a custom show list. The two sets of arrows 1111, namely the four directional ones and the top-down ones, provide navigational control for the on-screen menu and value change control on settings, respectively. The "enter" button in the middle of the two sets of arrows may be used for confirmation of the change.

Storage indicator 1112 may be illuminated with varying colors to indicate a current status of the free storage capacity, e.g., green for 31% to 100% storage availability, yellow for 10% to 30% storage availability, and red for below 10% storage availability. These ranges may be user-configurable through the on-screen menu. A show list display section 1102 may display all available show lists. A pair of up and down arrows 1129 may be used to cycle through the available show lists, including the all-inclusive list called "ALL". A group of four counters 1103, 1104, 1105, and 1106 each with a reset button and a "new item" indicator 1128 below it may show the number of shows available from the displayed list (e.g., ALL or Scheduled) for a specific content type, e.g., video, audio, photo, or text. Each "new item" indicator 1128 may have an associated "ack" (i.e., acknowledge) button 1130. In an embodiment, a newly available show may increment the count on a counter corresponding to the content type. The change in the count value may illuminate the corresponding "new item" indicator. The "new item" indicator would remain illuminated until either the "ack" button is pressed or the count becomes zero. Pressing "ack" button 1130 again can illuminate an indicator that has been off. Display section 1107 may present scheduled show times and the number of concurrent shows at that time. In an embodiment, if the scheduled shows have time conflict with one another, the display may provide the number of concurrent shows in relation to a specific show time of a scheduled show. A number "zero" displayed in this section means there are no conflicting show times. The pair of up-down arrows below display section 1107 may be used to cycle through the list of scheduled show times. In one embodiment, recent show times may appear before future show times.

User interface 1100 may further include a referrer selection display section 1113 (with its pair of navigation arrows below). Referrer selection display section 1113 may list the identity of the referrer of the show being played or being browsed in relation to a chosen show list in show list display section 1107, described above. A referrer may be a person or entity who may provide a show recommendation to the user. The recommendation may be provided using any of the techniques described herein, e.g., by sending a message. The choice may include the all-inclusive aggregate "ALL" when the list is being browsed. In an embodiment, choosing a referrer identity will result in only the shows from that referrer being displayed. Shows from all other referrers will be hidden from view. In this instance, show selection display section 1114 may display the show number and referrer selection display section 1113 may display the referrer identity of the in-play or in-pause show, if any, after some period of user inactivity at the control panel. If a new show is chosen to be played before such time, the new show appears in now showing section 1115. A show selection display section 1114 (with its pair of navigation arrows below) may list the consecutive show number of the show being played or being browsed in relation to the chosen show list in show list display section 1107, described above. Except for scheduled shows, newly arrived shows may be placed ahead of the existing ones. Hence, the show numbers of those existing shows may change. Show selection display section 1114 may revert to showing the show number of the in-play or in-pause show, if any, after some period of user inactivity at the control panel. In an embodiment, playing a chosen show other than the in-play or in-pause show before such time out may set the show as the new "now showing" show. A "now showing"

indicator section 1115 may indicate information about the show being played or paused, if any. A title display section 1116 may present the title of the show in-play, the show in-pause, or the show being browsed. A show type display section 1117 (with its one-directional navigation button) may present the current content type of the show being paused, the show being played, or the show being browsed. The choices of show type include the all-inclusive "ALL" when the display is presenting shows being browsed. A show time, show date, and show size display section 1118 may show the start time and date for a scheduled show and the length for a video/audio show and the number of pages for a photo/text show when the show in question is being browsed. In an embodiment, show time, show date, and show size display section 1118 may show the total playing time, elapsed time, or the current page number for the in-play or in-pause show.

User interface 1100 may further include a current calendar time display section 1121. A "Continuous Play On/Off" setting button 1119 may specify whether the next available show, if any, should be automatically played after the current show is finished. A "Repeat All/1/Off" setting button 1120 may specify whether all shows, the current "now playing" show, or no show should be repeated when a next show is due to be played. A "Play/Pause" control button 1122 may enable play or pause of the current show presented in show list display section 1102. Control button 1122 may operate in toggle mode, alternating between playing and pausing the show with each successive depression of the button. A "Stop" button 1123 may terminate the show in play. A "Forward or Next" button 1124 may forward the "now playing" video or audio show while being pressed, or goes to the next page of the "now playing" photo or text show. A "Rewind or Previous" button 1125 may rewind the "now playing" video or audio show while being pressed, or goes to the previous page of the "now playing" photo or text show. A "Save" button 1126 may cause the show being presented in show list display section 1102 to be moved to a default saved show list. A "Remove" button 1127 may cause a show being presented in the show list display section 1102 to be removed from its show list. In some embodiments, the corresponding content data may be deleted from the UCR's persistent cache (while keeping the actual content of the show intact at its source). Alternatively, the show may be moved to a Removed show list which may or may not be visible or accessible from show list display section 1102, and only an explicit cleanup operation request (e.g., through the on-screen menu) may remove the actual content data from the cache. In an embodiment, buttons 1122-1127 may have built-in indicators showing different symbols indicating the current state of these buttons, e.g., on and off, and play and pause.

Figure 12:
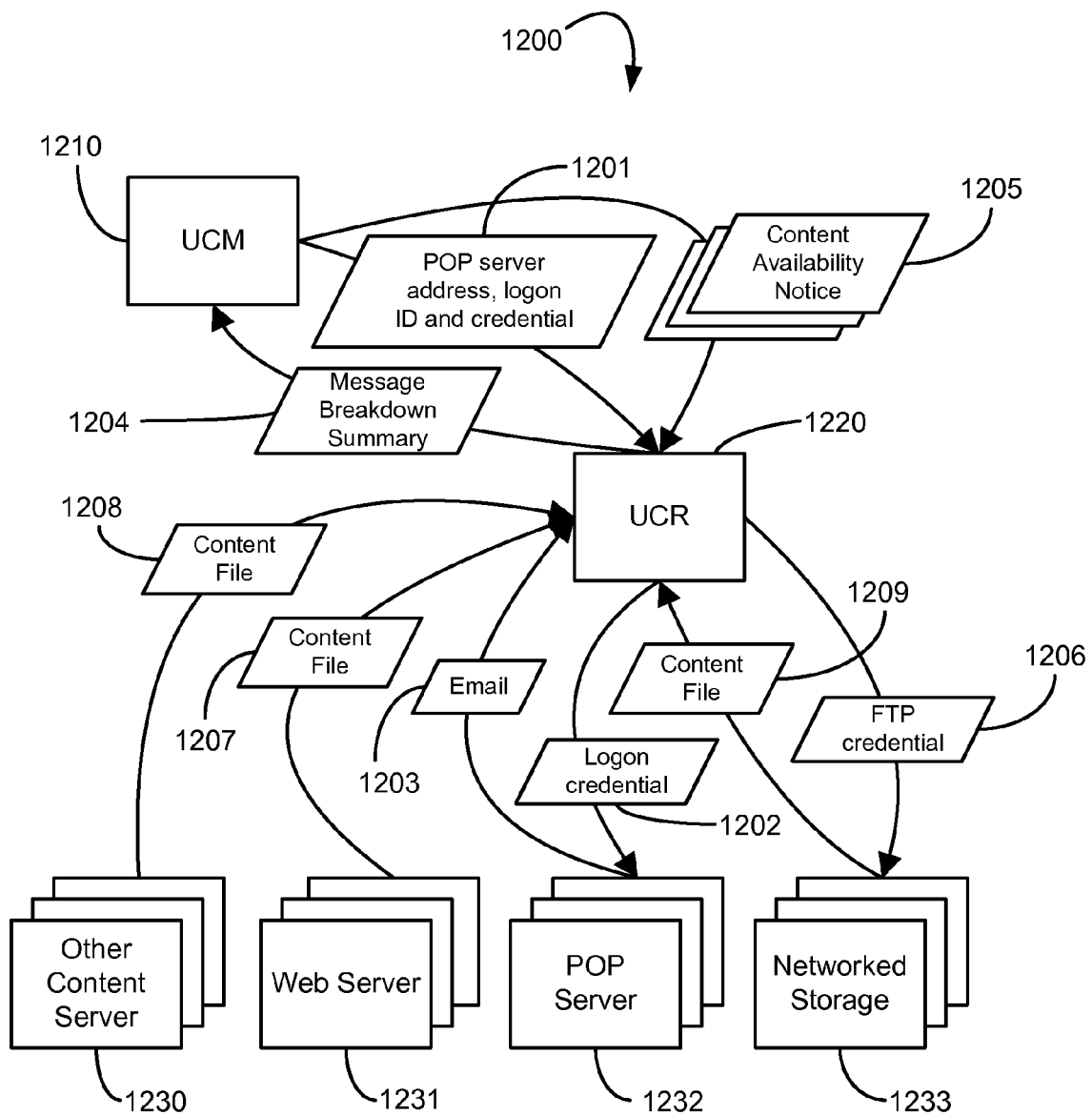
FIG. 12 is a high-level flow diagram of a process for automatic content retrieval according to an embodiment of the present invention.

FIG. 12 illustrates a flow diagram of a process 1200 for retrieving content according to an embodiment of the present invention. In this embodiment, a UCR, instead of or in addition to a UCM, may be responsible for retrieving or otherwise receiving messages (e.g., email, SMS, MMS, instant messages, and so on) including content notification and subscription. The illustration in FIG. 12 uses email as an example for clarifying and explaining the embodiment, but it is to be noted that the same is applicable for all types of messages discussed above. A UCR 1220 may obtain from a UCM 1210 the location or address of a POP server 1232 and a logon ID and credentials associated with a user email account (1201) available or accessible via POP server 1232. UCR 1220 may set up a periodic schedule of automatic retrieval, e.g., through the UCR scheduler, of email messages from the user account (1202, 1203). For each new email message retrieved, UCR 1220 may generate a Message Breakdown Summary (MBS) (1204), e.g., using the Content and Access Agent. The MBS may be identified by, among other data, the POP server location and logon ID. UCR 1220 may send the MBS to UCM 1210 (1204). UCM 1210 may generate a plurality of Content Availability Notices (CANs) for each received MBS (1205), and send them back to UCR 1220. UCR 1220 may retrieve or otherwise receive content data (1207, 1208, and 1209) from various content providers (e.g., a web server 1231, a networked storage 1233, and other content server 1230) in accordance to the instructions specified in the CANs 1205. For instance, CANs 1205 may specify access to networked storage 1233 (e.g., via FTP—File Transfer Protocol) along with additional information needed for the access (e.g., FTP credential 1206). In an embodiment, UCR 1220 may perform the CAN generation instead of UCM 1210. In that instance, UCM 1210 may serve as a central administration controller and backup manager.

A device or appliance embodying UCR 1220 may support a removable storage (e.g., a memory card) so that saved shows would be copied onto the storage for backup, and a new storage can be coupled to the device or appliance when needed. In some embodiments, UCR 1220 may allow its user to reply to a content referrer or arrange an external content provider to provide an advertisement before, during, and after a show with or without the involvement of UCM 1210. UCM 1210 may also accept a rating or comment for a show from a user of UCR 1220. These comments and/or rating may be shared with other UCR users.

In some embodiments, different external content providers may offer content for rent, sales, or subscription to a UCM through UCR(s). The UCM, through the UCR(s), may enforce the playback and download restrictions and conditions, and optionally collect payment from UCR users who rent or purchase the content. For example, the UCM may maintain credit card information, if authorized by the UCR user, as part of a UCR user account. One of the advantages realized by this scheme is that a home STB may be able to receive content from various content providers rather being limited to a single content provider who supplies the home STB to the user. For example, currently a household needs one set-top box for each provider of on-line content. The content provider may represent a single or multiple content sources such as a movie rental company and/or a consortium of content suppliers. Such a set-top box is a closed system where content providers not affiliated with the content provider may not be able to offer their content to the household for rent, sales or subscription. In an embodiment of the present invention, various content providers may be able to offer their content regardless of the STB provider.

In another embodiment, multiple UCRs associated with a single UCM may also be used, e.g., in a shop, a mall or over a geographically dispersed area to display common content (e.g., corporate video, advertisements and public notices) at multiple locations (mobile or otherwise) while having a central control to add, change, remove and interject content via the UCM. The playback of pre-downloaded multi-media content (including text) may be synchronized with the same playback schedule. A content provider with limited network bandwidth or capacity may still be able provide large files to many UCRs for presentation at the same future time with sufficient time to communicate the content to the UCRs.

It should be appreciated that the specific steps illustrated in FIG. 12 provide a particular method of processing content retrieval according to an embodiment of the present invention. Other sequences of steps may also be performed according to alternative embodiments. For example, alternative embodiments of the present invention may perform the steps outlined above in a different order. Moreover, the individual steps illustrated in FIG. 12 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 13:
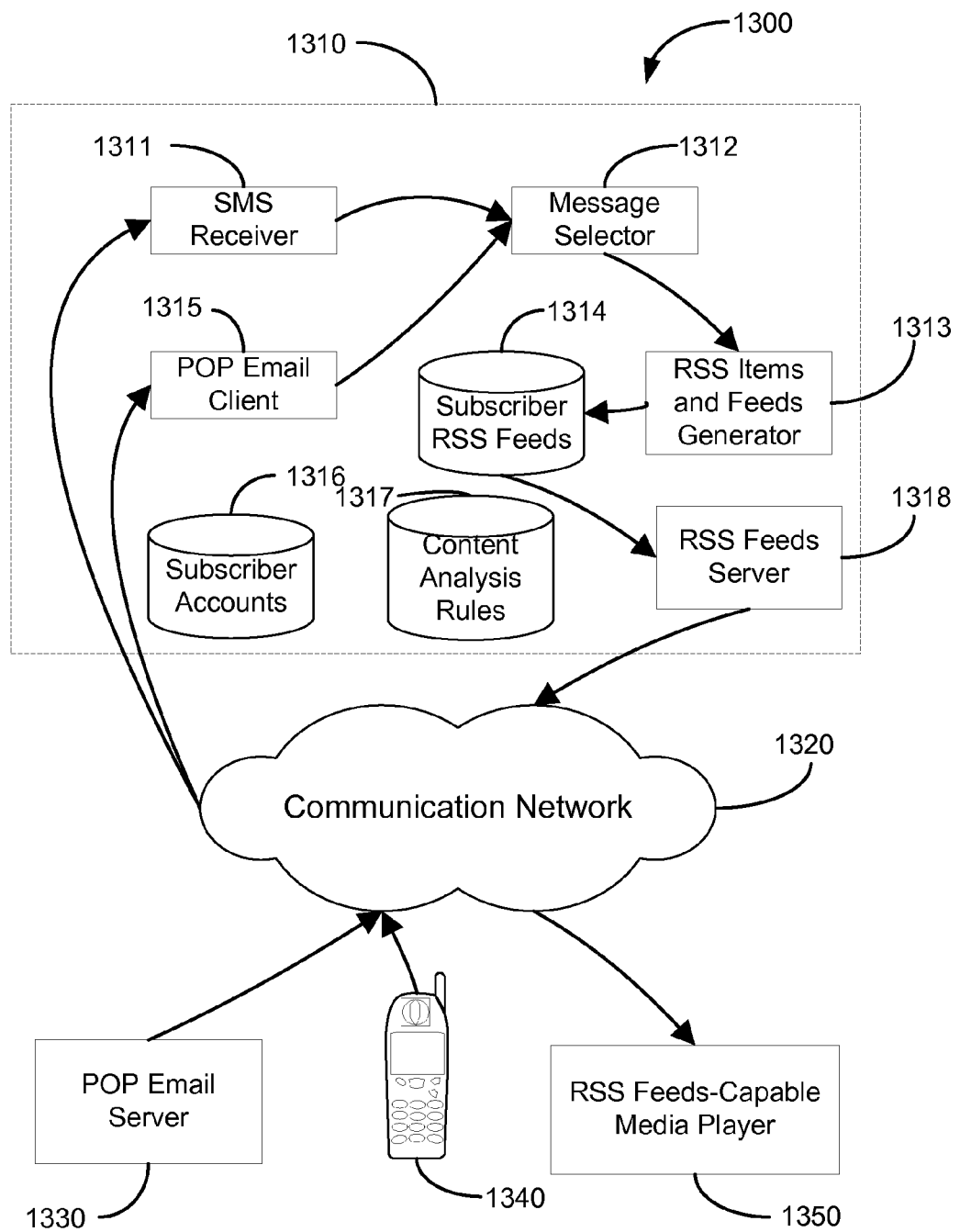
FIG. 13 is a high-level block diagram of yet another embodiment of the present invention.

FIG. 13 illustrates a system 1300 embodying the present invention according to an embodiment of the present invention. An application server 1310 may receive or otherwise obtain SMS and email messages originating from a user cell phone 1340 and a POP email server 1330, respectively. Application server 1310 may process these messages and generate Really Simple Syndication (RSS) feeds using a RSS feeds generator 1313. RSS feeds are summaries of online content that are published in the RSS format and may be used for retrieval of the online content. Application server 1310 may provide these RSS feeds to a media player 1350, which may download or otherwise retrieve the corresponding online content as digital files or streams from the locations specified in the RSS feeds. In this embodiment, application server 1310 functions as a UCM and media player 1350 functions as a UCR. Application server 1310 receives and obtains SMS and email messages through a SMS Receiver 1311 and a POP Email Client 1315, respectively. A Subscriber Accounts database or repository 1316 may maintain the information useful for application server 1310 and its components to perform their functions. For example, repository 1316 manages subscribers' email account names and passwords for accessing their POP email servers, and for mapping incoming SMS messages to specific subscribers. Subscriber Accounts database or repository 1316 also maintains the lists of SMS and email senders' identities from which a SMS or email message may be accepted or rejected. In addition, Subscriber Accounts database or repository 1316 may include information on how media URLs discovered or otherwise derived from message content should be organized or grouped. Message Selector 1312 may consult the repository 1316 to filter out unauthorized messages so that only authorized messages may reach RSS Items and Feeds Generator 1313. RSS Items and Feeds Generator 1313 may consult repository 1316 to decide if RSS items resulting from these media URLs so discovered or derived may belong to a default RSS feed or individual RSS feeds based on the SMS and email sender identities. In short, all subscriber-specific information relevant to the functions and operations of the application server may be maintained at Subscriber Accounts repository. 1316.

Content Analysis Rules database or repository 1317 may manage subscriber-independent information relevant to the functions and operations of application server 1310, such as the analysis of SMS and email messages and their content for generating for each such message a plurality of URLs through which online content may be downloaded or otherwise retrieved. Each URL so generated may become the content of the link element of a RSS item in a RSS feed that may be provided to media player 1350. The RSS feed may be considered as a listing of links or URIs to one or more contents. The other elements of the RSS item may serve to annotate the content of interest associated with the URL, e.g., as a content header to a content token, and hence a RSS item constituting a CAN. Information may be extracted from the message in question to provide content for such annotation. Examples of content analysis rules include but are not limited to patterns for matching URLs with certain keywords and suffixes, e.g., ignoring URLs ending in html or htm while attempting to access those with xml and RSS, patterns for matching domain names with known media content servers and websites, patterns for extracting user names and passwords specified in message content, recipes or algorithms for transforming URLs to a form through which media players can directly download the content of interest, and recipes or procedures for interpreting the content of and extracting media URLs from a webpage whose URL is specified in message content. RSS Items and Feeds Generator 1313 may consult Content Analysis Rules 1317 in its RSS items and feeds generation for generating the RSS feed.

FIG. 14 illustrates two examples of how a RSS item may be derived from an email message. Text blocks 1401 and 1402, show a media URL and a pair of login name and password that appear in a message body. The login name and password may be made available as part of the "link" of the RSS item, e.g., "addmeta:logon" and "addmeta:passwd" elements, respectively. The login name and password may be interpreted as the logon credentials for the FTP (File Transfer Protocol) retrieval of the online content referenced by the link. The other elements of the RSS item may be obtained or otherwise derived from the rest of the message body. The description element of the RSS item may be shortened and noted for the number of words not shown. For example, a subscriber in this case may be able to read the full content by accessing the actual email message at the POP server. In addition, the words "login" and "password" in the message body may be of freeform and the RSS Items and Feeds Generator may try to identify them while parsing the message body. In an embodiment, the text associated with "login" and "password" or their aliases may be regarded as a piece of information relevant to the content retrieval, or they may be explicitly defined keywords that a message sender would use to denote information and communicate it to the application server of FIG. 13.

Blocks 1403 and 1404 together show the difference between a media URL in a message and the resulting link in the corresponding RSS item. In some instances, a URL may not directly reference a media file or a piece of online content of interest in its downloadable form or mode, but rather reference the webpage that is associated with the URL. In order for a media player to download the online content, a simple rule or a set of instructions (which might be website-specific) may be adopted to convert or otherwise follow the URL of a media-carrying webpage to one that directly references the media of interest for download. The "link" element of example RSS item 1404 contains an example URL resulting from such a conversion. The original URL is captured in the "addmeta:originalurl" element. In addition, the email message may itself carry the set of instructions (e.g., as an attachment) which may be stored and re-used by a UCM and/or UCR. Furthermore, the actual URL in the description element may be replaced by a shorthand, e.g., "[*link-1*]", so that more information-carrying words may be displayed or otherwise included in the element. The RSS Items and Feeds Generator shown in FIG. 13 may communicate resultant RSS feeds, each comprising a plurality of RSS items, to Subscriber RSS Feeds database or repository 1314 of FIG. 13. RSS Feeds Server 1318 may respond to media players requesting RSS feeds using information in Subscriber RSS Feeds database or repository 1314. Since the application server may serve multiple media players and multiple subscribers, there may be a desire to keep certain RSS feeds of each subscriber or subscriber group private and prevent unauthorized subscribers from accessing them. In an embodiment, a single RSS feed may be shared by a group of users. The single RSS feed may have RSS items that belong to multiple users. In this instance, Web servers serving the single RSS feed may require authentication of these users at the time of request for the RSS feed. Once the user provides his authentication information, only the RSS items that belong to him may be presented to the user. In the other words, more than one subscriber may share a single URL for the RSS feeds, but they would receive different RSS feeds based on their identity.

In some embodiments, application server 1310 may generate a unique URL for each user or subscriber and link a user or subscriber-specific RSS feed to that URL. In an embodiment, a UCM, e.g., application server 1310, may store in a persistent storage the user credentials useful for authenticating requests for access to RSS feeds or to content associated with the RSS items in the RSS feeds. Whenever a UCR, e.g., a media player 1350, requests or receives a RSS feed, it may or may not be required to provide user authentication information in order to access the RSS feed. For instance, application server 1310 may retrieve user credentials to authorize and enable media player 1350 to access the content associated with the RSS items. This process may be transparent to the user of media player 1350. Note that RSS feeds are only an example of a listing of content notifications. Other formats, e.g., Atom feeds, or mechanisms may be used to provide such a listing.

Figure 15:
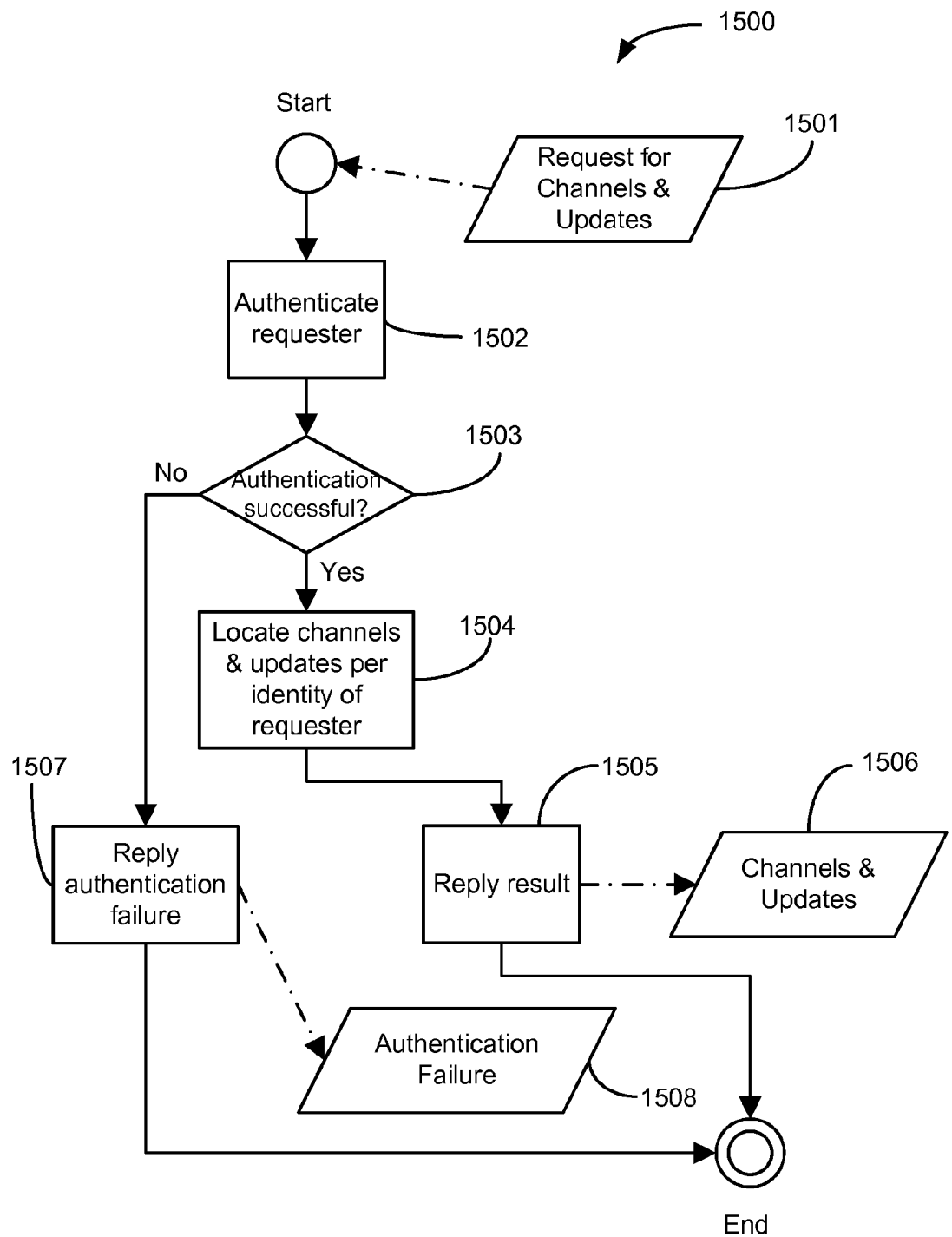
FIG. 15 is a high-level flow diagram illustrating an authentication process for retrieving content according to an embodiment of the present invention.

FIG. 15 shows a high-level flow diagram of a process 1500 for a method of authenticating a subscriber according to an embodiment of the present invention. This embodiment illustrates authentication of a proxy (e.g., a web browser or a media player) of a subscriber acting as a RSS feed requester. Periodically, the proxy may request a copy of a RSS feed (also called channel) and check for new content of interest (i.e., RSS items) that may be available. The proxy may also request some other updates that may be of interest to the subscriber or its proxy, e.g., the rules and instructions for accessing content available at certain websites. The subscriber or its proxy may use the same URL to request its own channels and updates. Such request (1501) may arrive at an application server, e.g. server 1310 of FIG. 13, possibly through a secure communications channel such as SSL. The request may include the subscriber or requester authentication information such as a username and a password, e.g., those provided by a subscriber to access his POP email server. The application server, e.g., through its RSS Feeds Server, may consult the Subscriber Accounts repository to check if the requester is authorized and identify the corresponding subscriber (1502). If the authentication fails at step 1503, the application server may communicate the authentication failure (1508) to the requester at step 1507. If the authentication is successful at step 1503, the application server may retrieve, from the Subscriber RSS Feeds repository, the RSS feeds or channels pertaining to the authenticated subscriber and communicate the RSS feeds or channels (1506) as reply to the requester, at steps 1504 and 1505. Note that a single reply (i.e., a single online resource) may contain more than one RSS feed (e.g., in form of OPML—Outline Processor Markup Language), as long as the requester is able to process such a reply. In an embodiment, RSS feed requesters of different subscribers may get their own private RSS feeds despite using the same URL for RSS feed requests.

It should be appreciated that the specific steps illustrated in FIG. 15 provide a particular method of authenticating a subscriber according to an embodiment of the present invention. Other sequences of steps may also be performed according to alternative embodiments. For example, alternative embodiments of the present invention may perform the steps outlined above in a different order. Moreover, the individual steps illustrated in FIG. 15 may include multiple sub-steps that may be performed in various sequences as appropriate to the individual step. Furthermore, additional steps may be added or removed depending on the particular applications. One of ordinary skill in the art would recognize many variations, modifications, and alternatives.

In other embodiments, a dynamically-generated RSS feed URL for each individual subscriber may be used in which the URL in question may be made up of a part common to all subscribers and a part which is obtained or otherwise derived from some unique subscriber identity (e.g., his email address). In some embodiments, a sequence number may also form part of the URL so that a single RSS feed or group of RSS feeds may be made available per sequenced URL. As such, the server would place for each subscriber his RSS feeds at these individualized URL(s). Upon the logon of a subscriber, a media player would be able to access the corresponding URL(s) to retrieve RSS feeds on behalf of the subscriber. For certain applications, the RSS Feeds Server in question may not require any authentication for RSS feed requests.

In yet another embodiment, the same user or access credentials may be used for both the user message account (e.g. for email retrieval) and the user subscriber account (e.g. for RSS feed retrieval). For example, a RSS feeds-capable media player and the like (such as the one depicted in FIG. 13) may be able to authenticate with a RSS feeds server on behalf of a subscriber who has supplied the media player with the logon credentials for his email account and authorized the media player to save and reuse the logon credentials. Upon successful authentication, the media player may receive a plurality of RSS feeds and be able to automatically download or otherwise retrieve the media content corresponding to the RSS items in those feeds. A user or an administrator may create and update a subscriber account and provide related information through a website or a UCR (e.g., a media player) to the Subscriber Accounts repository. Similarly, a user may help create and suggest rules that are maintained through the Content Analysis Rules repository. An administrator may facilitate and manage these user-created and suggested rules and have the option of creating his own rules.

Further, while the UCM and UCR are described herein with reference to particular modules, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of devices including electronic devices implemented using any combination of circuitry and software.

While the embodiment described above may make reference to specific hardware and software components as well as organizations and arrangements thereof, those skilled in the art will appreciate that different combinations, variations, and distributions of hardware and/or software components may also be used and that particular operations described as being implemented in hardware might also be implemented in software or vice versa. For instance, the functionality of the server depicted in FIG. 13 may be incorporated into an individual media player, whether software-based or as hardware appliance, or into some subscriber-specific proxy on the same or different computing host where the media player resides or operates. A subscriber may also specify which individual message senders may provide RSS feed subscriptions for consideration in which a RSS feed subscription URL in a message body from an authorized sender would result in a RSS feeds-capable media player subscribing to the corresponding RSS feed on behalf of the subscriber. Explicitly defined keyword such as one for removing RSS feed subscription may also be employed in a message. The RSS Items and Feeds Generator illustrated in FIG. 13 may also retrieve the content associated with the URLs extracted from a given message and may analyze the content as part of the RSS items and feeds generation processing. For example, the RSS Items and Feeds Generator may retrieve and analyze an online resource per extracted URL. If the retrieved online resource provides a mechanism for RSS feed subscriptions, then the RSS Items and Feeds Generator may decide whether the RSS feed subscriptions should be made available to or automatically subscribed for the subscriber, depending on the sender identity and authorization status. In other instances, instead of RSS, other technologies, schemes and specifications (such as the Atom Syndication Format) may also be used for providing URLs for media retrieval and download. In addition, various other media types other than or in addition to video such as photo, audio and text may also be supported. A supplementary service (e.g., through a self-serve webpage) may also be provided for a content notification sender or submitter to test if a given URL or webpage would result in an actionable URL or webpage, and what the resultant URL(s) would become. The service enables the sender or submitter to test his URLs before including them in his content notifications.

While the embodiment described above may make reference to specific hardware and software components as well as organizations and arrangements thereof, those skilled in the art will appreciate that different combinations, variations, and distributions of hardware and/or software components may also be used and that particular operations described as being implemented in hardware might also be implemented in software or vice versa. In addition, embodiments of the present invention may be realized using any combination of dedicated components and/or programmable processors and/or other programmable devices. While the embodiments described above may make reference to specific hardware and software components as well as organizations and arrangements thereof, those skilled in the art will appreciate that different combinations, variations, and distributions of hardware and/or software components may also be used and that particular operations described as being implemented in hardware might also be implemented in software or vice versa. In addition, while the various embodiments have been described in relation to email message accounts and SMS message accounts, the various content retrieval techniques described above are also applicable to mobile telephony accounts and fixed line telephony accounts.

Computer programs incorporating various features of the present invention may be encoded on various computer readable media for storage and/or transmission; suitable media include magnetic disk or tape, optical storage media such as compact disk (CD) or DVD (digital versatile disk), flash memory, and the like. Computer readable media encoded with the program code may be packaged with a compatible device or provided separately from other devices (e.g., via Internet download).

Thus, although the invention has been described with respect to specific embodiments, it will be appreciated that the invention is intended to cover all modifications and equivalents within the scope of the following claims.

What is claimed is:

1. A computer-implemented method for retrieval of digital content, the method comprising, by a computer system:
   receiving from a first user a request to associate a second storage medium with a first user account;
   associating the second storage medium with the first user account;
   accessing a message sent to the first user account, the message including information related to digital content, the first user account being associated with the first user, wherein the sending of the message is attributed to a second user not associated with the first user account, and at least a part of the digital content is available at a first storage medium, the part of the digital content not being available in the message;
   analyzing the message to identify the information related to the digital content, wherein the information includes an indication of access to or a location of the digital content, wherein analyzing the message to identify the information related to the digital content comprises determining the location of the digital content on the first storage medium based at least in part on the message and a location on the second storage medium based at least in part on the first user account;
   retrieving from the first storage medium the digital content based at least in part on the information related to the digital content; and
   storing at least a part of the digital content on the second storage medium wherein the accessing, the analyzing, the retrieving, and the storing are performed free from interaction with the first user.

2. The method of claim 1, further comprising:
   determining that the digital content does not already exist on the second storage medium based at least in part on the information related to the digital content; and
   storing the information related to the digital content, wherein the determining and the storing are performed free from interaction with the first user.

3. The method of claim 1, further comprising:
   receiving from the first user a request to associate a computer with the first user account;
   associating the computer with the first user account; and
   wherein storing at least a part of the digital content on the second storage medium comprises causing the computer to download the part of digital content on the second storage medium.

4. The method of claim 1, further comprising:
   causing the first user to be authenticated by a server;
   in response to the first user having been successfully authenticated, receiving an authorization for access to the second storage medium; and
   accessing the second storage medium based at least in part on the authorization for access to the second storage medium.

5. The method of claim 4, further comprising:
   obtaining a registration with the server; and
   wherein causing the first user to be authenticated by the server comprises causing the first user to be authenticated by the server in relation to the registration with the server.

6. The method of claim 5, wherein:
   retrieving from the first storage medium the digital content based at least in part on the information related to the digital content comprises retrieving from the first storage medium to a third storage medium the digital content based at least in part on the information related to the digital content; and
   storing at least a portion of the digital content on the second storage medium comprises retrieving from the third storage medium to the second storage medium at least a portion of the digital content.

7. The method of claim 4, further comprising:
obtaining a registration with another server;
causing the second user to be authenticated by the other server in relation to the registration with the other server;
in response to the second user having been successfully authenticated, receiving an authorization for access to the first storage medium; and
accessing the first storage medium based at least in part on the authorization for access to the first storage medium.

8. The method of claim 6, further comprising:
associating a second user account with the second user; and
in response to storing at least a part of digital content on the second storage medium, applying a charge to the second user account.

9. The method of claim 6, further comprising:
in response to storing at least a part of digital content on the second storage medium, applying a charge to the first user account.

10. The method of claim 6, further comprising:
in response to storing at least a part of digital content on the second storage medium, removing the part of digital content on the first storage medium.

11. The method of claim 6, further comprising:
wherein storing at least a part of the digital content on the second storage medium comprises storing the digital content on the second storage medium; and
in response to storing the digital content on the second storage medium, sending a notice to the second user, the notice indicating the digital content has been delivered.

12. A computer-implemented method for retrieval of digital content, the method comprising, by a computer system:
obtaining a registration with a server;
causing a first user to be authenticated by the server in relation to the registration;
in response to the first user having been successfully authenticated, receiving an authorization for access to a storage medium, the storage medium being associated with the first user;
receiving a request from a second user, the request identifying a digital content and the first user;
in response to receiving the request from the second user, determining a location of the digital content;
accessing the digital content based at least in part on the location of the digital content; and
storing the digital content on the storage medium based at least in part on the authorization, wherein the determining, the accessing, and the storing are performed free from interaction with the first user and the second user.

13. The method of claim 12, wherein determining the location of the digital content comprises generating a network-accessible location reference for the digital content, the network-accessible location reference including a uniform resource locator.

14. The method of claim 12, further comprising:
receiving from the second user an annotation, the annotation being related to the request from the second user; and
wherein storing the digital content on the storage medium based at least in part on the authorization comprises storing the digital content and the annotation on the storage medium based at least in part on the authorization, the annotation being associated with the digital content.

15. The method of claim 12, wherein storing the digital content on the storage medium based at least in part on the authorization comprises:

downloading to another storage medium the digital content; and
uploading from the other storage medium to the storage medium at least a part of the digital content based at least in part on the authorization, wherein the downloading, and the uploading are performed free from interaction with the first user.

16. A computer-implemented method for retrieval of digital content, the method comprising, by a computer system:
receiving from a first user a request identifying a digital content and a second user, the request not having the digital content, wherein the second user includes a group of users;
determining that a storage destination is associated with the second user; and
in response to determining that the storage destination is associated with the second user, storing at least a part of the digital content on the storage destination wherein the determining and the storing are performed free from interaction with the first user and the second user.

17. The method of claim 16, further comprising:
receiving from the first user a request identifying another digital content and a third user;
determining that no destination is associated with the third user; and
in response to determining that no destination is associated with the third user, generating a location reference to the other digital content, and sending a message to the third user, the message comprising the location reference, wherein the determining, the generating, and the sending are performed free from interaction with the first user and the third user.

18. A computer-implemented method for retrieval of digital content, the method comprising, by a computer system:
receiving from a device a digital content, the digital content being associated with a first user;
storing the digital content on a storage medium in relation to a first user account, the storage medium not being part of the device and the first user account being associated with the first user;
receiving a request for associating the first user with a second user, wherein the second user includes a group of users;
determining that a storage destination is associated with the second user; and
in response to determining that the storage destination is associated with the second user, copying at least a part of the digital content on the storage medium to the storage destination wherein the storing, the determining, and the copying are performed free from interaction with the first user and the second user.

19. The method of claim 18, further comprising:
associating the digital content on the device with the digital content on the storage medium, wherein the associating is performed free from interaction with the first user and the second user; and
wherein receiving the request for associating the first user with the second user comprises receiving the request from the first user, the request indicating the second user and the digital content.

20. A computer-implemented method for delivery of digital content, the method comprising, by a computer system:
receiving via a device a request from a user, the request indicating a location of a digital content and identifying a recipient, wherein the location of the digital content is not part of the device;

analyzing the request to identify the location of the digital content and a body text;

determining that the request comprises an indication to include the digital content in the message, wherein the indication to include the digital content in the message includes an instruction from the user, wherein the instruction from the user is part of the body text;

removing the instruction from the body text;

retrieving the digital content based at least in part on the location of the digital content;

generating a message based at least in part on the request, the message comprising the digital content, wherein generating the message based at least in part on the request comprises generating the message based at least in part on the request, the message comprising the body text and the digital content; and sending the message to the recipient wherein the retrieving, the generating, and the sending are performed free from interaction with the first user and the recipient.

21. A system, comprising:

one or more processors; and one or more memories communicatively coupled to the one or more processors when the system, the one or more memories bearing processor-executable instructions that, when executed on the one or more processors, cause the system at least to:

obtain a registration with a server; cause a first user to be authenticated by the server in relation to the registration; receive an authorization for access to a storage medium, the storage medium being associated with the first user;

receive a request from a second user, the request identifying a digital content and the first user;

determine a location of the digital content;

access the digital content based at least in part on the location of the digital content; and store the digital content on the storage medium based at least in part on the authorization, wherein the determining, the accessing, and the storing are performed free from interaction with the first user and the second user.

* * * * *